United States Patent
Sano

(10) Patent No.: US 12,155,211 B2
(45) Date of Patent: Nov. 26, 2024

(54) COMPUTER AND ELECTRICITY ADJUSTMENT METHOD

(71) Applicant: TOYOTA JIDOSHA KABUSHIKI KAISHA, Toyota (JP)

(72) Inventor: Takaaki Sano, Izumi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/813,458

(22) Filed: Jul. 19, 2022

(65) Prior Publication Data
US 2023/0100372 A1 Mar. 30, 2023

(30) Foreign Application Priority Data
Sep. 24, 2021 (JP) .................................. 2021-155699

(51) Int. Cl.
*H02J 3/00* (2006.01)
*G05B 19/042* (2006.01)

(52) U.S. Cl.
CPC ............ *H02J 3/008* (2013.01); *G05B 19/042* (2013.01); *G05B 2219/2639* (2013.01)

(58) Field of Classification Search
CPC .......... H02J 3/008; H02J 2310/54; H02J 3/14; H02J 3/381; H02J 7/02; H02J 2203/10; H02J 3/322
See application file for complete search history.

(56) References Cited

U.S. PATENT DOCUMENTS

| 11,173,804 B2 * | 11/2021 | Tsubokura | B60L 55/00 |
| 2011/0172837 A1 * | 7/2011 | Forbes, Jr. | H02J 3/004 |
| | | | 700/291 |
| 2016/0075247 A1 * | 3/2016 | Uyeki | H02J 3/00 |
| | | | 455/456.3 |
| 2019/0359065 A1 * | 11/2019 | Al-Awami | H02J 3/322 |
| 2021/0234368 A1 * | 7/2021 | Suzuki | H02J 3/28 |
| 2021/0305812 A1 * | 9/2021 | Ogawa | H02J 3/322 |
| 2022/0271533 A1 * | 8/2022 | Rilett | H02J 3/003 |
| 2023/0139438 A1 * | 5/2023 | Nishita | B60L 53/67 |
| | | | 320/109 |

FOREIGN PATENT DOCUMENTS

JP 2021036752 A * 3/2021

* cited by examiner

*Primary Examiner* — Mohammad Ali
*Assistant Examiner* — Dhruvkumar Patel
(74) *Attorney, Agent, or Firm* — Finnegan, Henderson, Farabow, Garrett and Dunner LLP

(57) ABSTRACT

A computer executes resource classification and resource selection. In the resource classification, each of a plurality of resources is classified as a first resource or a second resource having lower rated charging power than the first resource. In the resource selection, resources to act as reserves are selected for a reserve request from among the plurality of resources. In the resource selection for a first reserve request, the computer selects resources corresponding to the first resource with priority over resources corresponding to the second resource, and in the resource selection for a second reserve request, the computer selects resources corresponding to the second resource with priority over resources corresponding to the first resource. An adjustment period of the second reserve request is longer than an adjustment period of the first reserve request.

8 Claims, 12 Drawing Sheets

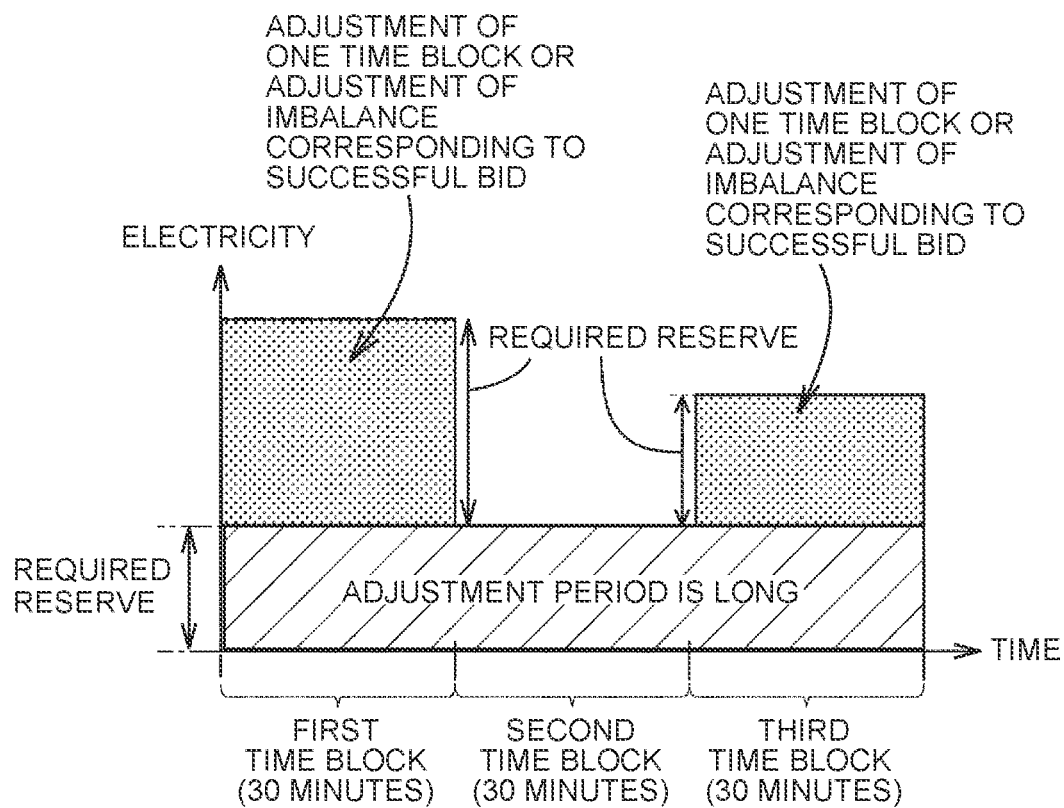

COMPUTER AND ELECTRICITY ADJUSTMENT METHOD

CROSS-REFERENCE TO RELATED APPLICATION

This application claims priority to Japanese Patent Application No. 2021-155699 filed on Sep. 24, 2021, incorporated herein by reference in its entirety.

BACKGROUND

1. Technical Field

This disclosure relates to a computer and an electricity adjustment method.

2. Description of Related Art

For example, Japanese Unexamined Patent Application Publication No. 2021-36752 (JP 2021-36752 A) discloses a technique of holistically simulating a time distribution of operation states of distributed resources, and based on the simulated time distribution of the operation states of the distributed resources, estimating a reserve that the distributed resources can supply. Specifically, according to the disclosure of JP 2021-36752 A, the time distribution of the operation states of the distributed resources is simulated using a state transition probability model that probabilistically represents behavior of each battery electric vehicle that is operated on a regular basis as to how its operation state, such as charging, plug-in (not charging), stationary (plug-out), or traveling, changes with time.

SUMMARY

In the technique described in JP 2021-36752 A, the time distribution of the operation states of the distributed resources is simulated using the state transition probability model. However, it is not necessarily easy to create a state transition probability model that allows such simulation with high accuracy. Further, the technique described in JP 2021-36752 A faces difficulty when it comes to causing an electricity storage device of a vehicle that travels at random times to act as a reserve.

This disclosure has been made to solve the above problem, and an object thereof is to easily and accurately select appropriate resources when selecting resources to act as reserves.

A computer according to a first aspect of this disclosure is configured to manage a plurality of resources each capable of acting as a reserve of an external power source. Each of the plurality of resources includes an electricity storage device. The computer is configured to execute resource classification and resource selection. The resource classification is a process of classifying each of the plurality of resources as a first resource or a second resource having lower rated charging power than the first resource. The resource selection is a process of selecting, for a reserve request, resources to act as reserves from among the plurality of resources. The computer is configured to select resources corresponding to the first resource with priority over resources corresponding to the second resource in the resource selection for a first reserve request, and select resources corresponding to the second resource with priority over resources corresponding to the first resource in the resource selection for a second reserve request. An adjustment period of the second reserve request is longer than an adjustment period of the first reserve request.

Hereinafter, this computer will be also referred to as a "management computer." Each of the plurality of resources managed by the management computer will be also referred to as an "object-to-be-managed." A reserve requested by the reserve request will be also referred to as a "requested reserve." A resource selected by the resource selection will be also referred to as an "adjusting resource."

The management computer classifies the object-to-be-managed as the first resource or the second resource. An electricity storage device that has higher rated charging power has a wider range of electricity ($\Delta$ kW) that can be adjusted by stopping charging and executing charging. Therefore, the first resource has a greater reserve than the second resource. By performing the classification, the management computer can increase the chance of selecting resources suitable for a requested reserve upon receiving a reserve request.

Specifically, the second reserve request requests securing a reserve for a long period (adjustment period). Since the adjustment period of the second reserve request is long, when a resource manager (user) is asked to adjust electricity for the adjustment period, it is highly likely that the adjusting resource drops out in the middle of the adjustment period. When the second resource having a smaller reserve is selected as an adjusting resource, the reserve lost by dropout of the adjusting resource is smaller. Therefore, it is easy to recover from the dropout of the adjusting resource. Even when recovery fails (i.e., a substitute reserve fails to be secured), only a small penalty is incurred. For the second reserve request, selecting adjusting resources from the second resources having a smaller reserve with priority can mitigate the loss due to dropout of adjusting resources.

The management computer may instruct a predetermined resource to drop out or participate in the middle of the adjustment period. The management computer may select, as adjusting resources for the second reserve request, a resource that drops out in the middle of the adjustment period and a resource that participates in the middle of the adjustment period. As dropout and participation occur at the same time, electricity adjustment is continuously performed. As a plurality of resources sequentially performs electricity adjustment, the binding time of each resource can be shortened. When second resources having a smaller reserve are selected as adjusting resources, switching from one adjusting resource to another has little impact on electricity adjustment. The management computer may set a schedule of electricity adjustment such that an adjusting resource drops out at a timing when the adjusting resource is expected to have been fully charged.

On the other hand, the first reserve request requests a reserve for a short period (adjustment period). Since the adjustment period of the first reserve request is short, when a resource manager (user) is asked to adjust electricity for the adjustment period, it is less likely that the adjusting resource drops out in the middle of the adjustment period. Moreover, when the first resources having a greater reserve are selected as adjusting resources, the requested reserve can be met by a smaller number of adjusting resources. Therefore, it is even less likely that the adjusting resources drop out. For the first reserve request, selecting adjusting resources from the first resources having a greater reserve with priority can increase the chance of securing sufficient reserves.

Before performing the resource selection for the first reserve request, the management computer may determine the likelihood of dropout of each resource corresponding to the first resource. Then, in the resource selection, the management computer may select first resources with a low likelihood of dropout with priority. Further, the management computer may exclude first resources with a high likelihood of dropout from candidates to be selected as adjusting resources.

As has been described above, the management computer having the above-described configuration makes it possible to easily and accurately select appropriate resources when selecting resources to act as reserves.

The term "reserve" means a capability in general to perform electricity adjustment (frequency control, demand-supply balance adjustment, etc.) of an external power source and also covers a reserve margin.

The external power source may be an electricity grid (e.g., a microgrid or a large-scale electricity grid established as an infrastructure). The external power source may supply alternating-current electricity or direct-current electricity. The management computer may be a stationary server or installed in a mobile terminal.

The management computer may be configured to trade reserves in an electricity market and generate a reserve request when the computer has made a successful bid for a reserve in the electricity market. In the electricity market, reserves may be traded on a time block basis. In the resource selection for selecting resources to act as the reserve corresponding to the successful bid, a reserve request of a predetermined number or a smaller number of time blocks may correspond to the first reserve request and a reserve request exceeding the predetermined number of time blocks may correspond to the second reserve request.

This configuration makes it possible to easily and accurately select appropriate electricity storage devices when selecting resources to act as a reserve corresponding to a successful bid in an electricity market.

Examples of electricity markets include a previous day market (spot market), an intraday market, a demand-supply adjustment market, a capacity market, and a real-time market.

The length of the time block may be 30 minutes. The predetermined number of time blocks may be one time block. This configuration can increase the chance of selecting appropriate adjusting resources for each of the first reserve request and the second reserve request. In the electricity market, a transaction may be executed for 48 time blocks into which one day is divided by 30 minutes.

The predetermined number of time blocks is not limited to one time block but can be arbitrarily set. The length of the time block (unit time) traded in the electricity market varies from one country or region to another. For example, in a form in which the length of the time block is five minutes, the predetermined number of time blocks may be selected within a range of four time blocks or more to ten time blocks or less.

The management computer may be configured to generate the reserve request when imbalance in generation-consumption balance relating to the external power source occurs. The management computer may be configured to select resources corresponding to the first resource with priority over resources corresponding to the second resource in the resource selection for selecting resources to act as reserves for eliminating the imbalance.

In this configuration, adjusting resources are selected from the first resources having a greater reserve with priority in the resource selection for selecting electricity storage devices to act as reserves for adjusting imbalance in generation-consumption balance. Thus, the adjusting resources are less likely to drop out in the middle of the adjustment period. This configuration can increase the chance of eliminating the imbalance.

Imbalance in generation-consumption balance corresponds to, for example, a difference between a planned demand or supply value and an actual demand or supply value. When a demand prediction turns out to be wrong and the actual value of demand (electricity consumption) becomes larger than the planned value, imbalance in generation-consumption balance occurs. Also when a power generation prediction (e.g., a prediction of electricity generated by solar power generation or wind power generation) turns out to be wrong and an actual value of supply (power generation) becomes larger than a planned value, imbalance in generation-consumption balance occurs. Demand and supply amounts agreed upon in the electricity market may be handled as planned demand and supply values.

The first resource may be a resource with rated charging power higher than a criterion value. The second resource may be a resource with rated charging power equal to or lower than the criterion value. The criterion value may be 2 kW or higher and 5 kW or lower.

This configuration can increase the chance of selecting appropriate adjusting resources for each of the first reserve request and the second reserve request. The criterion value may be 3 kW.

The plurality of resources (objects to be managed) may include a vehicle that is electrically connected to an external power source through a charging facility.

Thus utilizing on-board batteries can increase the chance of securing sufficient reserves for a reserve request.

The management computer may be configured to cause resources selected by the resource selection to act as reserves through remote control.

This management computer can easily and accurately cause electricity storage devices (adjusting resources) to act as reserves by performing charging control of the electricity storage devices through remote operation.

The management computer may be configured to determine a target reserve for the reserve request. The management computer may be configured to select resources to act as reserves for the reserve request in the resource selection such that the total of rated charging power of the selected resources reaches the target reserve.

This configuration can increase the chance of securing sufficient reserves for a reserve request. The management computer may determine, as the target reserve, a reserve obtained by adding an allowance (Δ kW) to the requested reserve (Δ kW).

The management computer may be configured to select resources from the first resources in the resource selection for the first reserve request such that the total of rated charging power of the selected resources approaches the target reserve. When all resources corresponding to the first resource are selected and yet the total of rated charging power of the selected resources does not reach the target reserve for the first reserve request, the management computer may select resources enough to cover the shortage from the second resources. The management computer may be configured to select resources from the second resources in the resource selection for the second reserve request such that the total of rated charging power of the selected resources approaches the target reserve. When all resources corresponding to the second resource are selected and yet the total of rated charging power of the selected resources does not reach the target reserve for the second reserve request, the management computer may select resources enough to cover the shortage from the first resources.

In this configuration, the management computer selects the first resources with priority for the first reserve request, and when the number of the first resources falls short, uses the second resources to secure sufficient reserves. Further, the management computer selects the second resources with priority for the second reserve request, and when the number of the second resources falls short, uses the first resources to secure sufficient reserves. This configuration can increase the chance of securing sufficient reserves for each of the first reserve request and the second reserve request.

An electricity adjustment method according to a second aspect of this disclosure includes resource classification, reserve determination, first resource selection, second resource selection, and resource control shown below.

In the resource classification, each of a plurality of resources each capable of acting as a reserve of an external power source is classified as a first resource or a second resource having lower rated charging power than the first resource. In the reserve determination, it is determined whether a reserve request is a first reserve request or a second reserve request that requests electricity adjustment for a longer adjustment period than the first reserve request. In the first resource selection, when the reserve request is determined to be the first reserve request, resources corresponding to the first resource are selected with priority over resources corresponding to the second resource in selecting reserves for the reserve request. In the second resource selection, when the reserve request is determined to be the second reserve request, resources corresponding to the second resource are selected with priority over resources corresponding to the first resource in selecting reserves for the reserve request. In the resource control, the resources selected as reserves for the reserve request are caused to act as reserves of the external power source.

Like the management computer described above, this electricity adjustment method makes it possible to easily and accurately select appropriate resources when selecting resources to act as reserves.

According to this disclosure, it is possible to easily and accurately select appropriate resources when selecting resources to act as reserves.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 13 is a graph illustrating an electricity adjustment method according to the embodiment of this disclosure.

DETAILED DESCRIPTION OF EMBODIMENTS

Figure 1:
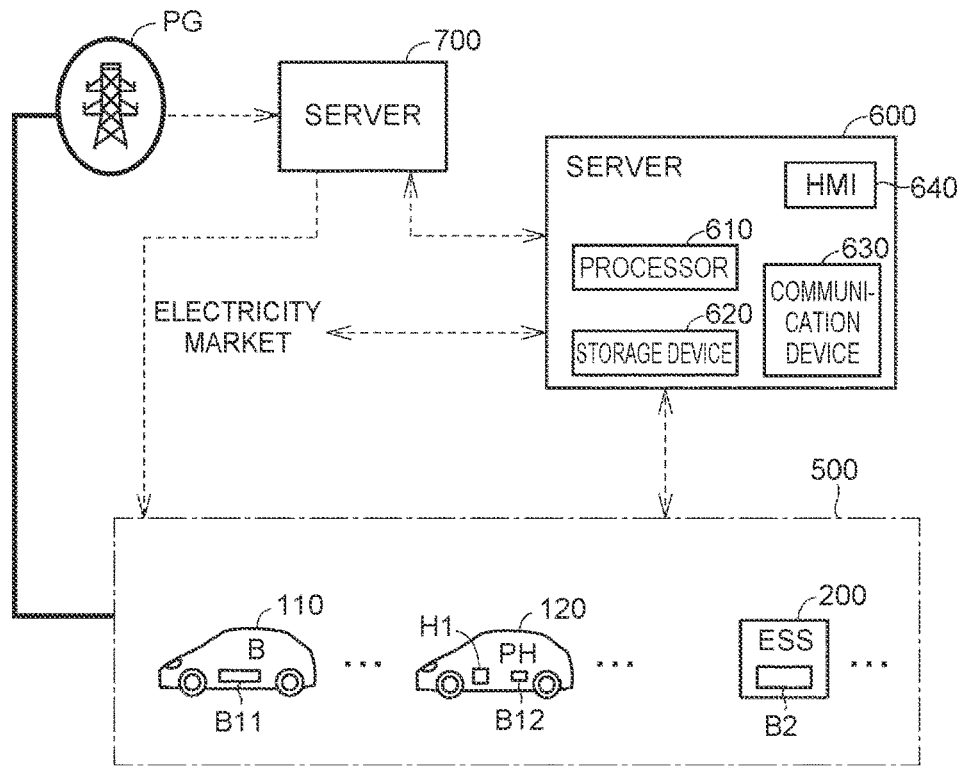
FIG. 1 is a diagram showing a schematic configuration of an electricity management system according to an embodiment of this disclosure.

An embodiment of this disclosure will be described in detail with reference to the drawings. The same or corresponding parts in the drawings are denoted by the same reference signs and the description thereof will not be repeated.

FIG. 1 is a diagram showing a schematic configuration of an electricity management system according to the embodiment of this disclosure. Referring to FIG. 1, the electricity management system according to this embodiment includes a resource group 500, a server 600, and a server 700.

The server 600 manages the resource group 500. The resource group 500 includes a plurality of resources each including an electricity storage device. Each resource is configured to be able to electrically connect to a power grid PG. Each resource functions as a reserve for performing electricity adjustment of the power grid PG. In this embodiment, the resource group 500 includes, as resources, a battery electric vehicle (BEV) 110, a plug-in hybrid electric vehicle (PHEV) 120, and an energy storage system (ESS) 200. While one each of these resources (the BEV, PHEV, and ESS) is shown in FIG. 1, the number of each type of resource included in the resource group 500 is independently arbitrarily set, and may be 10 or more or 100 or more.

The BEV 110, the PHEV 120, and the ESS 200 include a battery B11, a battery B12, and an electricity storage device B2, respectively. Each of the battery B11, the battery B12, and the electricity storage device B2 is an electricity storage device configured to be capable of charging and discharging.

Each of the BEV 110 and the PHEV 120 is an xEV that is configured to travel using electricity stored in a battery (electricity storage device). An xEV is a vehicle that uses electricity as all or part of its motive power source. Specifically, each of the BEV 110 and the PHEV 120 supplies electricity from the battery to an electric motor (not shown) and travels on motive power generated by the electric motor. As each of the batteries B11, B12, a commonly known vehicle electricity storage device (e.g., a liquid secondary battery, an all-solid secondary battery, or a battery pack) can be adopted. Examples of vehicle secondary batteries include a lithium-ion battery and a nickel-metal hydride battery.

A travel energy storage device included in the BEV 110 is only the battery B11. On the other hand, the PHEV 120 includes a travel energy storage device other than the electricity storage device (battery B12). The PHEV 120 includes a travel motive power source H1. The motive power source H1 includes an internal combustion engine and a fuel tank from which fuel is supplied to the internal combustion engine. The PHEV 120 can travel on motive power output from the internal combustion engine without using electricity. The fuel tank corresponds to a travel energy storage device.

The ESS 200 is a stationary resource. The ESS 200 may be provided in a building (a single-family house, apartment, commercial facility, factory, hospital, school, etc.). The ESS 200 may be configured to supply electricity to electric loads installed in the building (e.g., air conditioning equipment, floor heating equipment, lighting equipment, cooking equipment, and a water heater in a house). The ESS 200 may function as an emergency power source of a building. The ESS 200 may be configured to store surplus electricity generated by power generation equipment installed in a building (e.g., renewable energy power generation equipment, such as solar power generation equipment or wind power generation equipment). As the electricity storage device B2, a commonly known stationary electricity storage device (e.g., a lithium-ion battery, lead-acid storage battery, nickel-metal hydride battery, redox flow battery, or sodium-sulfur (NAS) battery) can be adopted.

The power grid PG is an electricity grid built by power transmission and distribution facilities. A plurality of power plants is connected to the power grid PG. The power grid PG is supplied with electricity from these power plants. In this embodiment, an electric power company maintains and manages the power grid PG (commercial power source). The electric power company corresponds to a TSO (system operator) to be described later. The power grid PG supplies alternating-current electricity (e.g., three-phase alternating-current electricity). The server 700 is, for example, a computer belonging to the TSO. The server 700 has a central supply system and a simple command system built therein that will be described later. The server 600 and the server 700 are configured to be able to communicate with each other.

Figure 2:
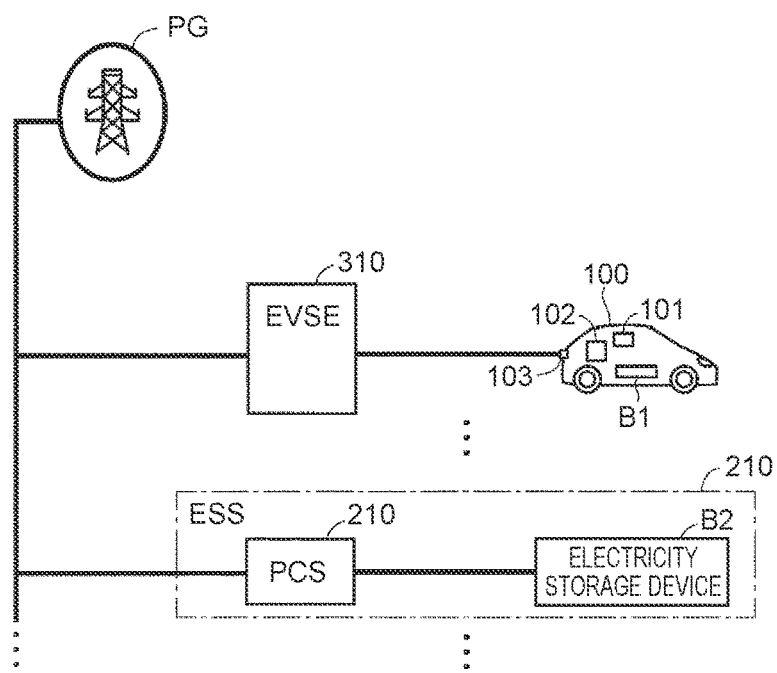
FIG. 2 is a diagram showing a state of each resource when performing electricity adjustment of an external power source in the electricity management system shown in FIG. 1.

FIG. 2 is a diagram showing a state of each of the BEV 110, the PHEV 120, and the ESS 200 when performing electricity adjustment of the power grid PG. Hereinafter, each of the BEV 110 and the PHEV 120 will be referred to as an "xEV 100" and each of the batteries B11, B12 will be referred to as a "battery B1," except where distinction is made in the description.

Referring to FIG. 2 along with FIG. 1, the xEV 100 includes an electronic control unit (ECU) 101, a charger 102, and an inlet 103. The xEV 100 performs electricity adjustment of the power grid PG in a state of being electrically connected to the power grid PG through electric vehicle supply equipment (EVSE) 310. A plug of the EVSE 310 (e.g., a plug provided at a leading end of a charging cable leading to a main body of the EVSE 310) is connected to the inlet 103 of the xEV 100, and the xEV 100 and the power grid PG are thereby electrically connected to each other. Hereinafter, a state where the xEV 100 and the power grid PG are electrically connected to each other will be referred to as an "xEV connected state." A state where the xEV 100 and the power grid PG are not electrically connected to each other will be referred to as an "xEV disconnected state." The xEV 100 that is traveling is in the xEV disconnected state.

The charger 102 is located between the inlet 103 and the battery B1 and controlled by the ECU 101. The charger 102 includes, for example, an inverter. When the xEV 100 stores electricity supplied from the power grid PG, the ECU 101 controls the charger 102 such that appropriate electricity is input into the battery B1 through the inlet 103 in the xEV connected state.

In the xEV connected state, the xEV 100 communicates with the server 600 through the EVSE 310. The server 600 and the EVSE 310 may communicate with each other through the Internet. The server 600 can control the charger 102 by sending a command to the xEV 100 through the EVSE 310. Thus, the server 600 can cause the battery B1 to charge for electricity adjustment of the power grid PG through remote control.

The xEV 100 may be a privately owned vehicle (POV) or a Mobility-as-a-Service (MaaS) vehicle. An MaaS vehicle is a vehicle managed by an MaaS company. The xEV 100 may include a wireless communication device (e.g., a data communication module (DCM)) that can access a mobile communication network (telematics), and may be configured to wirelessly communicate with the server 600 through the mobile communication network without involving the EVSE. The xEV 100 may receive a command or a notification from the server 600 by this wireless communication device. In this embodiment, a VIG-type xEV (a type of xEV that is supplied with electricity one-sidedly from a power grid) is used as a resource (reserve). However, the xEV is not limited thereto, and an xEV having at least one of a V2G function (a function to exchange electricity bidirectionally with a power grid) and a V2H (vehicle to home) function may be used as a resource (reserve).

The ESS 200 further includes a power conditioning system (PCS) 210. The power grid PG is connected to the electricity storage device B2 through the PCS 210. The PCS 210 and the power grid PG are electrically connected to each other. The ESS 200 is always electrically connected to the power grid PG. The PCS 210 is configured to be able to communicate with the server 600. The server 600 and the PCS 210 may communicate with each other through the Internet. The PCS 210 includes an operation control device, a protection device, and an electricity conversion circuit (none is shown). The PCS 210 switches electrical connection and interruption between the electricity storage device B2 and the power grid PG in response to a request from the server 600. In the PCS 210, the operation control device controls the electricity conversion circuit in accordance with a command from the server 600. The electricity conversion circuit includes, for example, an inverter. The server 600 can control charging and discharging of the electricity storage device B2 by sending a charging or discharging command to the PCS 210.

The server 600 can cause the electricity storage device B2 to charge or discharge for electricity adjustment of the power grid PG through remote control. Specifically, when outputting electricity from the ESS 200 to the power grid PG, the electricity conversion circuit of the PCS 210 is controlled such that appropriate electricity is output from the electricity storage device B2 to the power grid PG through the PCS 210. When storing electricity supplied from the power grid PG in the ESS 200, the electricity conversion circuit of the PCS 210 is controlled such that appropriate electricity is input from the power grid PG into the electricity storage device B2 through the PCS 210.

The server 600 is configured to manage a plurality of pieces of EVSE 310 and a plurality of PCSs 210 provided in a predetermined area in which the power grid PG supplies electricity. The plurality of pieces of EVSE 310 may include public EVSE 310 (e.g., EVSE installed along a road or in a public facility) that a large number of unspecified users can use, and non-public EVSE 310 that only specified users can use (e.g., household EVSE). The server 600 is, for example, a computer belonging to an aggregator. An aggregator is an electricity company that provides an energy management service by aggregating a plurality of distributed energy resources (hereinafter also referred to as a "DER"). Each of the xEV 100 and the ESS 200 can function as a DER. The server 600 may remotely and integrally control a plurality of DERs to thereby cause these DERs to function as a virtual power plant (VPP). A VPP is a framework in which a large number of DERs are aggregated by a sophisticated energy management technology using Internet of things (IoT) and these DERs are remotely and integrally controlled so as to function as if they were one power plant. The server 600 may conduct demand response (DR) for each DER. The power grid PG and the server 600 according to this embodiment correspond to examples of the "external power source" and the "computer," respectively, according to this disclosure.

Figure 3:
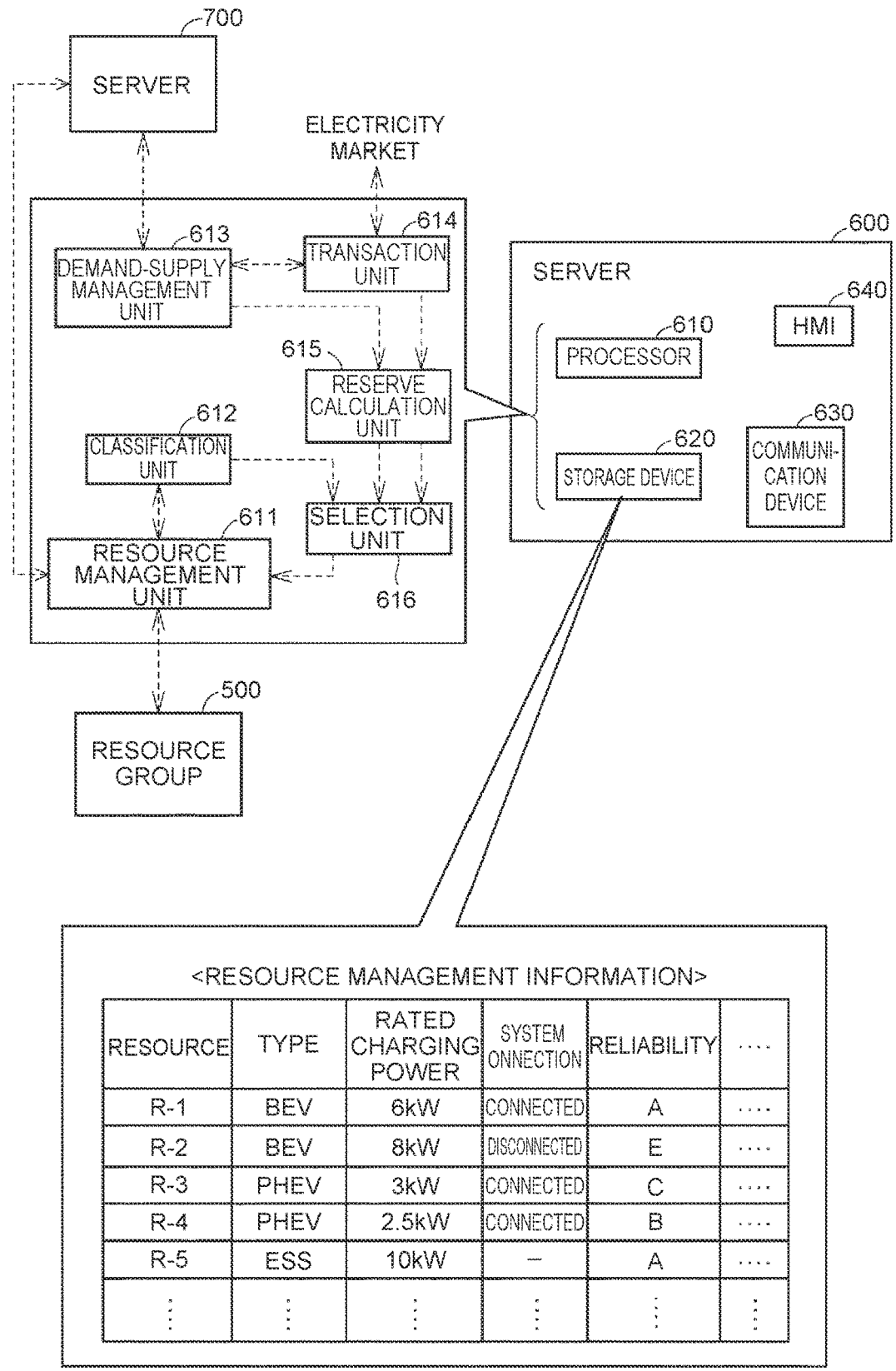
FIG. 3 is a diagram showing a detailed configuration of a management computer (server) according to the embodiment of this disclosure.

FIG. 3 is a diagram showing a detailed configuration of the server 600. Referring to FIG. 3, the server 600 includes a processor 610, a storage device 620, a communication device 630, and a human-machine interface (HMI) 640. The processor 610 may be a central processing unit (CPU). The number of processors included in the server 600 is arbitrary and may be one or more than one. The storage device 620 is configured to be able to store various types of information. The storage device 620 stores programs to be executed by the processor 610 as well as information used in the programs (e.g., maps, mathematical expressions, and various parameters). The communication device 630 includes various communication interfaces (I/Fs). The server 600 is configured to communicate with an outside through the communication device 630. The HMI 640 includes an input device and a display device. The HMI 640 may include a touch panel display. The HMI 640 may include a smart speaker that receives a voice input.

In this embodiment, the server 600 includes a resource management unit 611, a classification unit 612, a demand-supply management unit 613, a transaction unit 614, a reserve calculation unit 615, and a selection unit 616 to be described below. For example, these units are realized by the processor 610 and programs executed by the processor 610. However, without being limited thereto, these units may be realized by dedicated hardware (electronic circuit).

The resource management unit 611 is configured to acquire information on each resource from the resource group 500. For example, a state of each resource may be sent from the resource to the server 600. The xEV 100 may send the current position (e.g., the longitude and the latitude) and the system connection state (the xEV connected state or the xEV disconnected state) to the server 600. The resource management unit 611 may update resource management information stored in the storage device 620 based on the information acquired from each resource.

Figure 4:
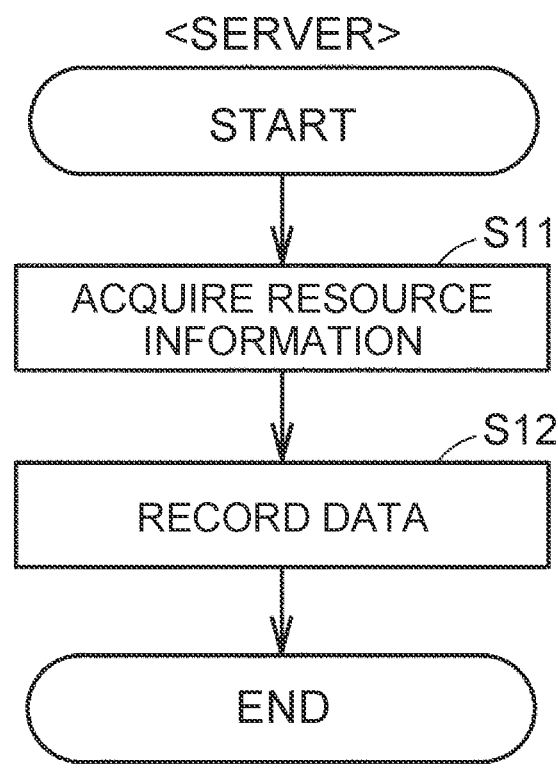
FIG. 4 is a flowchart showing a process relating to acquisition of resource information executed by the management computer shown in FIG. 3.

FIG. 4 is a flowchart showing a process relating to acquisition of resource information executed by the server 600. The process shown in this flowchart is executed for each resource. Hereinafter, a resource for which the process is executed will be referred to as a "resource to be processed." The server 600 repeatedly executes the process shown in FIG. 4, for example, in predetermined cycles. However, the condition for executing the process shown in FIG. 4 is not limited thereto and can be arbitrarily set for each resource. For example, for a resource to be processed that is an xEV, the process shown in FIG. 4 may be executed at a timing when the xEV connected state and the xEV disconnected state are switched. Hereinafter, each step in flowcharts will be represented simply by "S."

Referring to FIG. 4 along with FIG. 1 to FIG. 3, in S11, the server 600 acquires information about the resource to be processed (hereinafter referred to as "resource information"). For example, when the resource to be processed is the ESS 200, the server 600 communicates with the PCS 210 and acquires resource information (e.g., the state-of-charge (SOC)) from the PCS 210. The SOC shows a remaining amount of electricity stored in the electricity storage device and, for example, represents the ratio of the current amount of stored electricity relative to the amount of stored electricity in a fully charged state by 0 to 100%. When the resource to be processed is the xEV 100, the server 600 communicates with the ECU 101 and acquires resource information (e.g., the system connection state and the SOC) from the xEV 100. The server 600 may acquire resource information showing rated charging power of the electricity storage device in S11. The rated charging power is maximum charging power of the electricity storage device shown by the manufacturer of the electricity storage device. However, how to manage information on xEVs differs among automobile manufacturers. Therefore, the contents of resource information that the server 600 can acquire from the xEV 100 can vary among xEVs.

In subsequent S12, the server 600 updates the resource management information (FIG. 3) stored in the storage device 620 using the resource information acquired in S1 described above. When the resource to be processed is not registered in the server 600, identification information (ID) is given to the resource to be processed. Then, data about the resource to be processed is added to the resource management information shown in FIG. 3 so as to be connected to the ID.

As shown in FIG. 3, the resource management information according to this embodiment is stored in the storage device 620 of the server 600 while being classified by the resource through the identification information (ID). The ID of the resource may be a unique number given to each resource or a communication address of the resource.

The resource management information includes the type (BEV, PHEV, or ESS) of the resource and the rated charging power of the resource. Each of the type and the rated charging power of the resource may be registered in the server 600 (storage device 620) in advance. Or the server 600 may acquire the type and the rated charging power of the resource from the resource to be processed by the process of S11 of FIG. 4 described above. The resource management information further includes the system connection state (the xEV connected state or the xEV disconnected state) relating to an xEV. The server 600 acquires the system connection state of the xEV by the process of S11 of FIG. 4 described above.

The resource management information further includes reliability information on each resource. The reliability information is information showing reliability relating to electricity adjustment (i.e., the probability that the resource performs electricity adjustment as requested). That the resource has high reliability means that that resource is highly likely to continuously provide a requested reserve during a requested period. A resource having lower reliability is more likely to drop out in the middle of the requested period. In this embodiment, the resource management unit 611 evaluates the reliability of each resource and updates the reliability information based on the evaluation result. Specifically, the resource management unit 611 gives a rank (one of A to E) according to the reliability to each resource.

The rank of reliability lowers in order of A, B, C, D, and E. While reliability is represented in five levels in this embodiment, how to represent reliability is arbitrary. For example, reliability may be represented by a point. The resource management unit 611 may evaluate the reliability of each resource based on performance data of the resource for a predetermined period (e.g., an entire period or the last one year). The resource management unit 611 may evaluate the reliability of each resource based on the results of assessments I and II to be described later.

While this is not shown in FIG. 3, the resource management information may further include the position of the resource. The resource management information may further include the SOC, the temperature, and the current of the electricity storage device. The resource management information may further include whether the resource is experiencing an abnormality. The resource management information may further include a travel plan relating to an xEV. The server 600 may acquire these pieces of information by the process of S11 of FIG. 4 described above.

The resource management unit 611 is configured to control the resources selected by the selection unit 616 in accordance with a command from the server 700. The resource management unit 611 is configured to cause the resources selected by the selection unit 616 to act as reserves through remote control.

The classification unit 612 is configured to execute resource classification of the resource group 500. The resource classification is a process of classifying each of the plurality of resources (including electricity storage devices) included in the resource group 500 as a first resource or a second resource having lower rated charging power than the first resource. In this embodiment, a resource of which the rated charging power is higher than a predetermined criterion value (hereinafter represented by "Th1") is classified as the first resource, and a resource of which the rated charging power is equal to or lower than Th1 is classified as the second resource. While Th1 can be arbitrarily set, in this embodiment. Th1 is 3 kW.

The demand-supply management unit 613 is configured to acquire demand-supply information on the power grid PG from the server 700. Further, the demand-supply management unit 613 monitors actual demand and supply of the power grid PG. The actual demand and supply of the power grid PG may be measured with a watt-hour meter provided for each resource, or may be measured with a transmitted-electricity measuring instrument. The watt-hour meter for each resource may include a smart meter, or a watt-hour meter that is built inside the EVSE 310 or the PCS 210. The demand-supply management unit 613 generates a reserve request when imbalance in generation-consumption balance relating to the power grid PG occurs.

The transaction unit 614 is configured to execute a transaction in an electricity market. The transaction unit 614 executes a bid in the electricity market and informs the demand-supply management unit 613 of the bid result. When the transaction unit 614 has made a successful bid for a reserve in the electricity market, the transaction unit 614 generates a reserve request.

The reserve calculation unit 615 is configured to calculate a target reserve for the reserve request.

The selection unit 616 is configured to execute resource selection of the resource group 500 for the reserve request. The resource selection is a process of selecting resources to act as reserves from among a plurality of resources (including electricity storage devices) included in the resource group 500. The selection unit 616 selects one or more resources to act as reserves for the reserve request such that the total of the rated charging power of the selected resources reaches the target reserve. The selection unit 616 informs the resource management unit 611 of the selected resources. Details of the resource selection will be described later (see FIG. 8 and FIG. 11).

Figure 5:
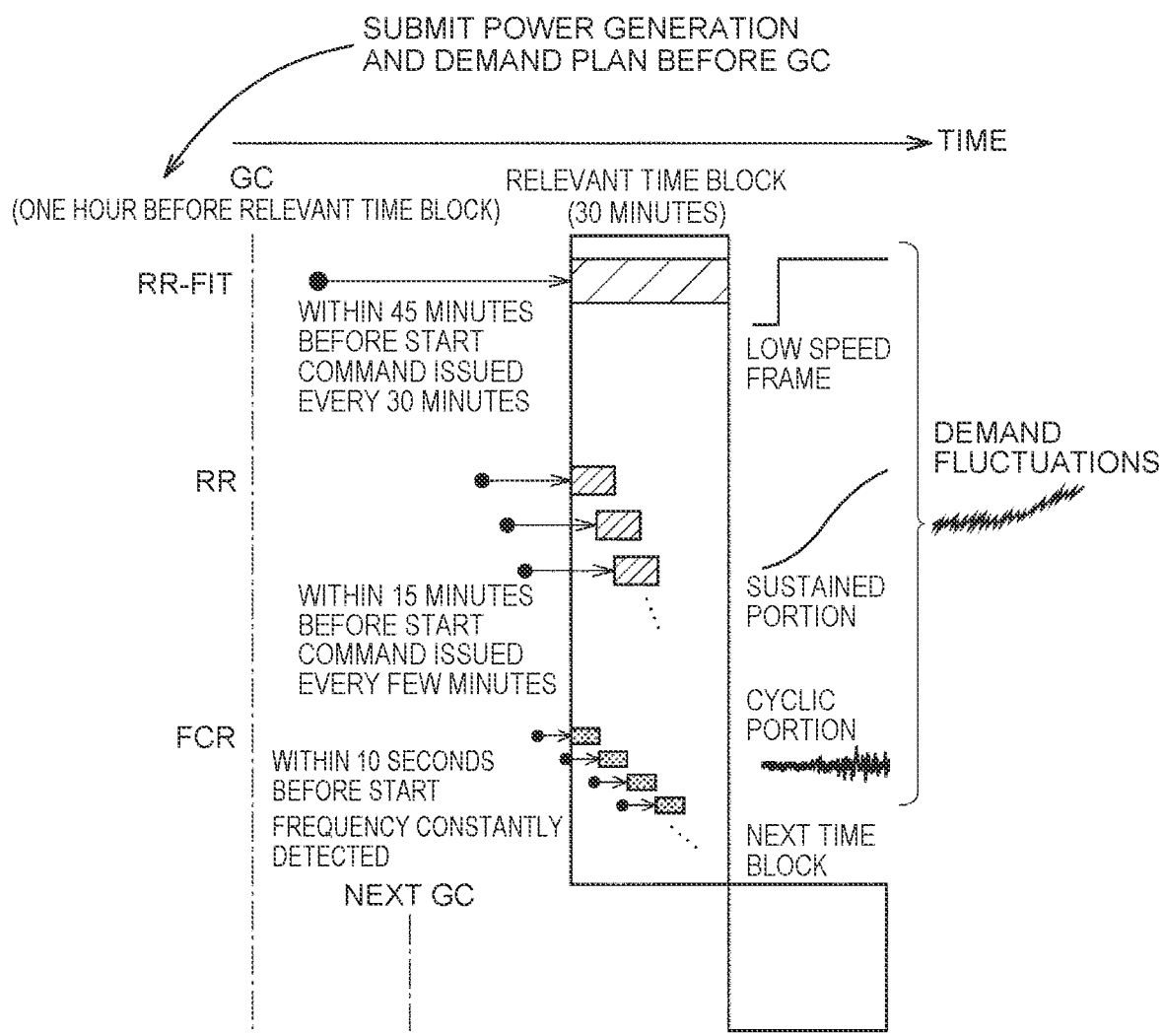
FIG. 5 is a diagram showing an overview of an electricity market according to the embodiment of this disclosure.

FIG. 5 is a view showing an overview of an electricity market relating to this embodiment. In the following, the electricity market according to this embodiment will be described using FIG. 5. However, the electricity market to be described below is merely one example. The computer (server 600) according to this embodiment is applicable to arbitrary electricity markets.

A balancing group (BG) that uses the power grid PG is responsible for achieving a generation-consumption balance. The BG corresponds to a balance responsible party (BRP). Examples of BGs include an electricity retailer, a power generation company, and an aggregator. In this embodiment, a planned value-based generation-consumption balancing system is adopted. The BG submits a planned value for each time block to a predetermined organization in advance. The time blocks are frames into which one day is divided by a unit time. In this embodiment, the length of one time block (unit time) is 30 minutes. The predetermined organization may be Organization for Cross-regional Coordination of Transmission Operators (OCCTO). Imbalance in generation-consumption balance (a mismatch with a planned value) is evaluated for each time block. A BG that has caused imbalance is obliged to pay an imbalance fine (penalty). A BG that frequently causes imbalance can be deprived of the license.

The term "electricity market" according to this embodiment covers a spot market (previous day market), a time-ahead market (intraday market), a demand-supply adjustment market, and a capacity market. The spot market and the time-ahead market are opened and operated by a wholesale electricity exchange, such as Japan Electric Power Exchange (JEPX). In each market, transactions with electricity as a commodity are executed. Each commodity is sold and bought by, for example, a bid system. In each market, commodities are traded on a time block basis. In a wholesale electricity exchange, transactions are executed for 48 time blocks into which one day is divided by 30 minutes. "GC" (gate close) in FIG. 5 represents the market closing time for each time block. Before the GC, the BGs can use the market to adjust a mismatch between a planned value and actual demand or supply in the relevant time block (the time block corresponding to the GC). The BGs may procure a reserve for eliminating imbalance by demand response (DR).

The demand-supply adjustment market is a market where an operator of the power grid PG (hereinafter represented by "TSO" (transmission system operator)) procures a reserve. The TSO may be a general power transmission and distribution operator. The reserve provides the power grid PG with flexibility (the ability to change the production or consumption of electricity according to electricity fluctuations). After the GC, the TSO adjusts the demand and supply using the reserve procured through the demand-supply adjustment market. The TSO controls the reserve (resource) procured in the market by governor free (GF) control, load frequency control (LFC), or economic load dispatch control (EDC). Thus, a generation-consumption balance in the power grid PG is achieved.

The reserves traded in the demand-supply adjustment market are roughly divided into reserves for normal times and reserves in the event of an accident. The reserves for normal times are further classified into reserves for prediction errors and reserves for fluctuations within a time frame. Prediction errors include a demand prediction error and a renewable energy prediction error. The prediction error is an average error (30-minute average error) between the planned value and the actual value for each time block. The fluctuations within a time frame are fluctuations within the time block (shorter than 30 minutes).

The BGs predict demand and submit a demand plan before the GC. However, a prediction error (a difference between the predicted value and the actual value of electricity demand) can occur after the GC. The reserve for a demand prediction error is a reserve for eliminating a prediction error that occurs after the GC. The reserve for a renewable energy prediction error is a reserve for eliminating a renewable energy prediction error (a difference between the predicted value and the actual value of a renewable energy output) that is expected at the time of the GC. The TSO controls the reserves for prediction errors by mainly using LFC and EDC.

Each of the electricity demand and the renewable energy output varies from hour to hour. Even if the predicted value and the actual value match as 30-minute average values, fine fluctuations occur during a shorter time than 30 minutes. The reserve for fluctuations within a time frame is a reserve that responds so as to match the demand and the supply relative to fluctuations within a time frame. Regarding control of the reserve for fluctuations within a time frame, the TSO uses GF for fluctuations within a time shorter than one minute and uses LFC or EDC for fluctuations within a time equal to or longer than one minute.

The reserve in the event of an accident is a reserve for eliminating a difference between demand and supply resulting from an unpredictable trouble (e.g., power source cutoff). The TSO procures a back-up power source in the market in case of power source cutoff. Regarding control of the back-up power source (the reserve in the event of an accident), the TSO uses GF immediately after cutoff and then sequentially switches to LFC and EDC.

Demand fluctuations can be broken down into an extremely short periodic component (cyclic portion), a short periodic component (fringe portion), and a long periodic component (sustained portion).

In the demand-supply adjustment market, a reserve for the cyclic portion (primary reserve) and a reserve for the fringe portion (secondary reserve-1) are traded. The primary reserve corresponds to a frequency containment reserve (FCR). Regarding the FCR, the responding time is within 10 seconds and the duration time is five minutes. The secondary reserve-1 corresponds to a synchronized frequency restoration reserve (S-FRR). Regarding the S-FRR, the responding time is within five minutes and the duration time is 30 minutes (one time block).

In the demand-supply adjustment market, a reserve for a part of the sustained portion that corresponds to a difference from the preceding time block (secondary reserve-2) and a reserve for a part of the sustained portion that continues from the preceding time block (tertiary reserve-1) are further traded. The secondary reserve-2 corresponds to a frequency restoration reserve (FRR). Regarding the FRR, the responding time is within five minutes and the duration time is 30 minutes (one time block). The tertiary reserve-1 corresponds to a replacement reserve (RR). Regarding the RR, the responding time is within 15 minutes and the duration time is three hours (six time blocks).

Further, in the demand-supply adjustment market, a reserve for the feed-in tariff (FIT) special system (tertiary reserve-2) is also traded. In the FIT special system, the TSO is responsible for imbalance relative to a power generation plan. The TSO determines a planned power generation value by predicting a renewable energy output two days before the time block. Then, on the day before the time block, the TSO procures the tertiary reserve-2 for eliminating the renewable energy prediction error (a prediction error relative to two days before). The tertiary reserve-2 corresponds to a replacement reserve for feed-in tariff (RR-FIT). Regarding the RR-FIT, the responding time is within 45 minutes and the duration time is three hours (six time blocks).

In the capacity market, a power source I' is traded. The power source I' is a reserve (reserve margin) for mainly dealing with a harsh weather (fierce heat, severe cold, etc.) that occurs about once in every ten years. The power source I' is always secured for a predetermined period as a dedicated power source of the TSO. Regarding the power source I', the responding time is within three hours and the duration time is two to four hours (four to eight time blocks).

A person who has made a successful bid for a reserve in the demand-supply adjustment market (successful bidder) adjusts electricity within the range of the bid amount (an amount of Δ kW as agreed upon) relative to a reference value (kW). The successful bidder registers the reference value in a demand-supply adjustment market system before the GC (one hour before the start time of the time block corresponding to the successful bid). The bid amount may be plus (an increasing reserve) or minus (a decreasing reserve). The successful bidder performs electricity adjustment in accordance with a command from the TSO during one or more time blocks (provision period) corresponding to the successful bid. When an output command value is changed during the provision period, the successful bidder changes the output to that value within the responding time of the commodity requirement. When the output command value continues to be the same value during the provision period, the successful bidder continues to output in accordance with the command at least during the duration time of the commodity requirement.

The successful bidder notifies the TSO of resources (e.g., a list pattern) to be used for electricity adjustment. The server 700 of the TSO sends a command for the resources of the successful bidder by a system of a central power supply command center (central supply system) or the simple command system. The resources may be connected on-line to the central supply system though a dedicated line. For example, when the server 700 controls the resource group 500 through the command, the server 700 may control the resources through the server 600 (aggregator) or directly control the resources. The successful bidder sends the performance data of the resources for all the time blocks corresponding to the successful bid to the TSO after the end of these time blocks. During the provision period (the adjustment period of the reserve corresponding to the successful bid), the TSO checks for each time block (30 minutes) that the successful bidder maintains a state where the amount of Δ kW as agreed upon can be provided (whether Δ kW can be provided) and that the successful bidder is adjusting in accordance with the command within the range of the amount of Δ kW as agreed upon (response performance). When it is found that the requirement specified for Δ kW of the object-to-be-traded is not complied with as a result of at least one of the assessment of whether Δ kW can be provided (assessment I) and the assessment of response performance (assessment II), a predetermined penalty is imposed on the successful bidder.

The aggregator executes electronic commercial transactions using the server 600. The server 600 trades reserves in the electricity market. Accounting of market transactions is managed by the server 600. When the server 600 has made a successful bid for a reserve in the electricity market, the server 600 generates a reserve request corresponding to the reserve for which the bid has been won. Then, for the reserve request, the server 600 selects resources (including electricity storage devices) to act as reserves from the resource group 500. In the following, an example in which the server 600 makes a bid in the demand-supply adjustment market will be described.

Figure 6:
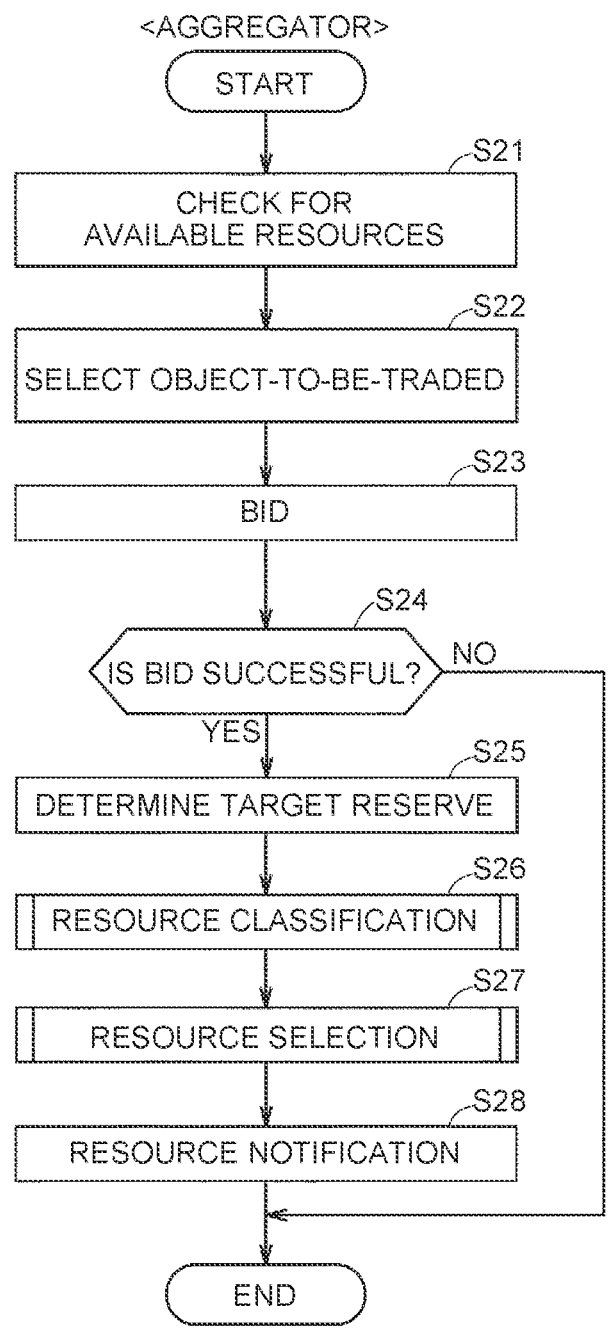
FIG. 6 is a flowchart showing a process relating to a market transaction executed by the management computer shown in FIG. 3.

FIG. 6 is a flowchart showing a process relating to a market transaction executed by the server 600. The process shown in this flowchart is executed when a predetermined condition is met. The predetermined condition may be met at a predetermined time of day or met on a regular basis. The predetermined condition may be met when the server 600 receives a bid command from a user. The server 600 may determine a timing suitable for bidding based on at least one of a market price, weather information (including weather forecast information), a demand history of the resource group 500, and the state of each resource included in the resource group 500, and execute the process shown in FIG. 6 at the timing suitable for bidding.

Referring to FIG. 6 along with FIG. 1 to FIG. 3, in S21, the transaction unit 614 checks for resources in the resource group 500 that are available as reserves. For example, the transaction unit 614 recognizes resources that are not experiencing an abnormality as available resources. Regarding xEVs, the transaction unit 614 may exclude those xEVs that are scheduled to travel in the time block corresponding to an object-to-be-traded (relevant time block) from the available resources.

In subsequent S22, the transaction unit 614 selects an object-to-be-traded (a commodity to bid for) based on the available reserves (resources) checked in S21. In this embodiment, the object-to-be-traded is a reserve. Subsequently, the transaction unit 614 makes a bid for the object-to-be-traded selected in S23. The transaction unit 614 may select and bid for a commodity under preset conditions. The transaction unit 614 may select and bid for a commodity under conditions specified by the user. Further, the transaction unit 614 may select and bid for a commodity using a learned model obtained by machine learning using artificial intelligence (AI).

In subsequent S24, the transaction unit 614 determines whether the bid made for the commodity (reserve) is successful. When the bid is not successful (NO in S24), the sequence of processes shown in FIG. 6 ends. However, without being limited thereto, when the bid is not successful, the transaction unit 614 may return the process to S22 and bid for another commodity.

Figure 7:
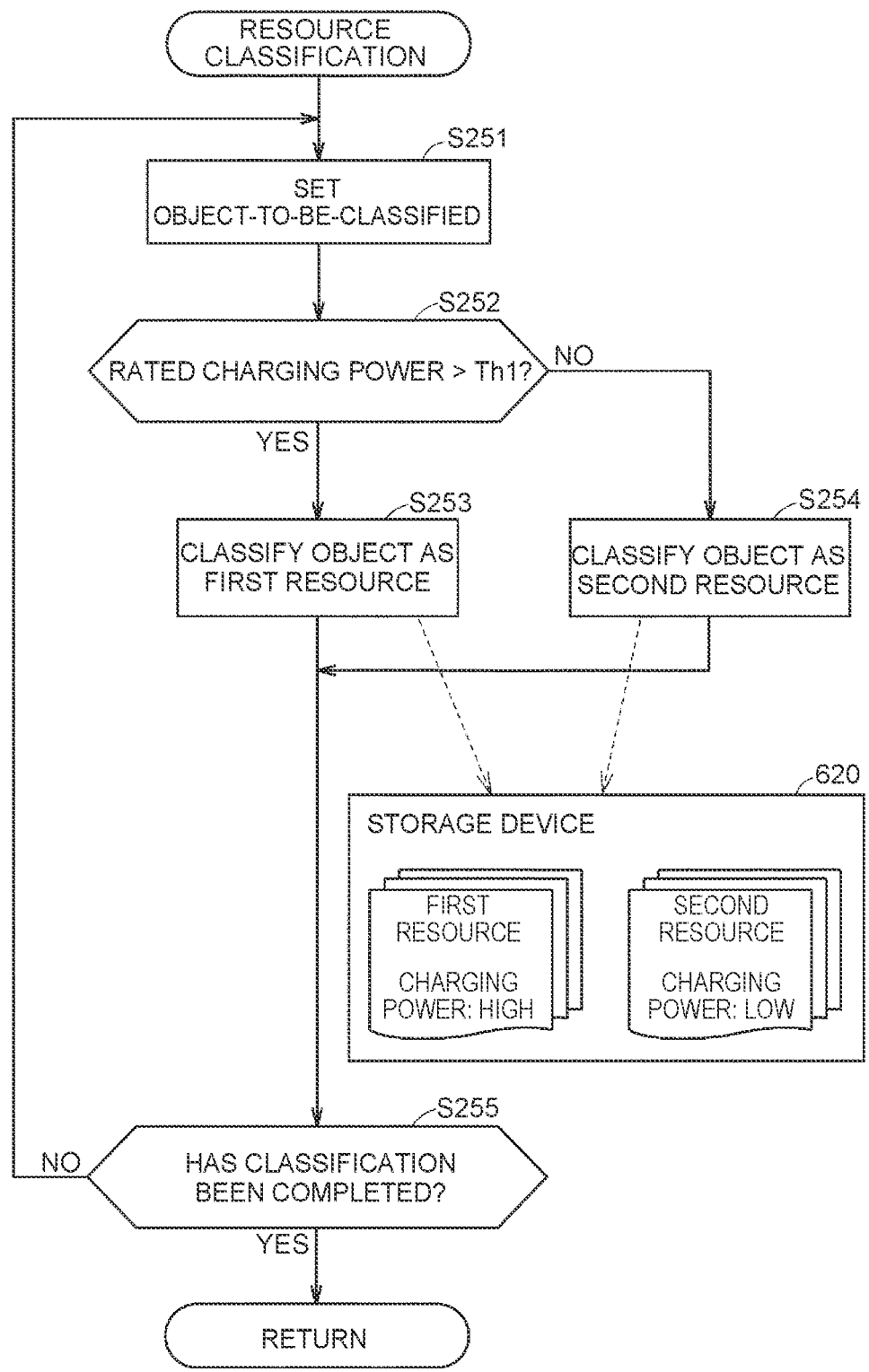
FIG. 7 is a flowchart showing details of resource classification shown in FIG. 6.

When the bid is successful (YES in S24), the transaction unit 614 moves the process to S25. That the transaction unit 614 moves the process to S25 means that the transaction unit 614 has generated a reserve request. In S25, the reserve calculation unit 615 determines a target reserve for the reserve request. For example, the reserve calculation unit 615 determines, as the target reserve, a value obtained by multiplying the reserve corresponding to the successful bid (the amount of Δ kW as agreed upon) by a predetermined allowance factor (e.g., a factor selected from a range of larger than 1.0 and not larger than 2.0). In S26, the classification unit 612 executes the resource classification. FIG. 7 is a flowchart showing details of S26.

Referring to FIG. 7 along with FIG. 1 to FIG. 3, in S251, the classification unit 612 sets an object-to-be-classified from among the available resources checked in S21 of FIG. 6. Hereinafter, a resource that is to be classified will be referred to simply as an "object-to-be-classified."

In S252, the classification unit 612 determines whether the rated charging power of the object-to-be-classified is higher than Th1 based on the resource management information shown in FIG. 3. When the rated charging power of the object-to-be-classified is higher than Th1 (YES in S252), the classification unit 612 classifies the object-to-be-classified as the first resource in S253. When the rated charging power of the object-to-be-classified is Th1 or lower (NO in S252), the classification unit 612 classifies the object-to-be-classified as the second resource in S254. The classification result is recorded in the storage device 620.

Figure 8:
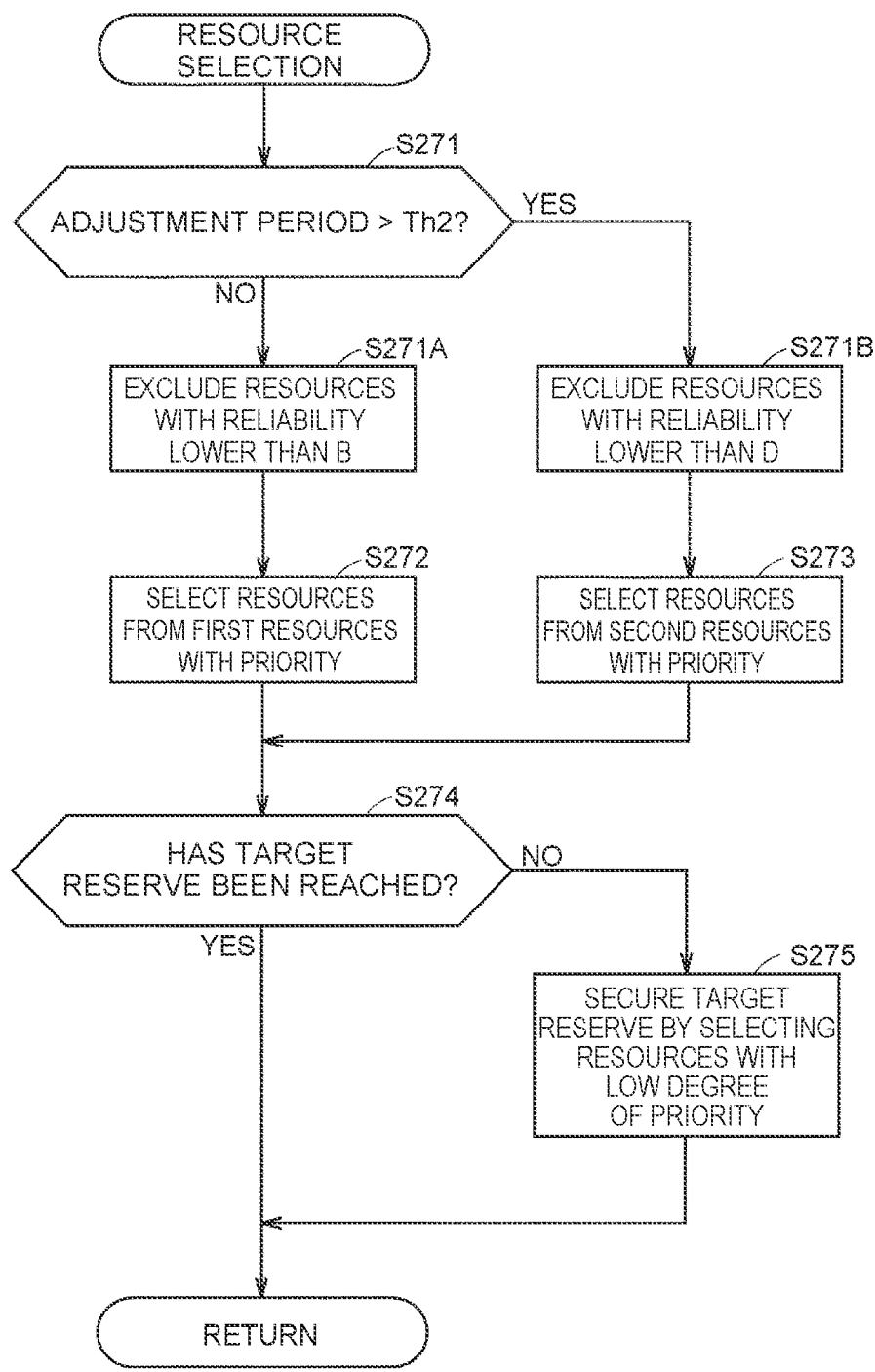
FIG. 8 is a flowchart showing details of resource selection shown in FIG. 6.

Thereafter, in S255, the classification unit 612 determines whether classification of all the available resources has been completed. When there is an unclassified resource (NO in S255), the process flow returns to S251. In S251, the unclassified resource is set as an object-to-be-classified. In S251, the available resources are sequentially set as the object-to-be-classified one by one. Thus, the resource classification (S252 to S254) is executed for all the available resources. When resource classification of all the available resources has been completed (YES in S255), the sequence of processes shown in FIG. 7 ends and the process flow moves to S27 of FIG. 6. In S27, the selection unit 616 executes resource selection. FIG. 8 is a flowchart showing details of S27.

Referring to FIG. 8 along with FIG. 1 to FIG. 3, in S271, the demand-supply management unit 613 determines whether the adjustment period (provision period) of the commodity (reserve) corresponding to the successful bid is longer than a predetermined threshold value (hereinafter represented by "Th2"). Th2 can be arbitrarily set, and in this embodiment, Th2 is one time block (30 minutes).

When the length of the adjustment period is Th2 or shorter (NO in S271), the process moves to S271A. That the length of the adjustment period is Th2 or shorter means that the reserve request resulting from the successful bid is the first reserve request. In S271A, the selection unit 616 excludes resources with reliability lower than a predetermined first standard among the available resources (selection candidates) from the selection candidates. The first standard can be arbitrarily set. In this embodiment, the first standard is B. In S271A, resources of which the reliability rank (see FIG. 3) is C, D, or E are excluded from the selection candidates.

In S272 following S271A, the selection unit 616 selects the resources classified as the first resource (S253 of FIG. 7) with priority over the resources classified as the second resource (S254 of FIG. 7) from among the selection candidates. The selection unit 616 may select all the first resources included in the selection candidates. When the number of the first resources is too large for the target reserve, the selection unit 616 may select a minimum number of first resources that can secure the target reserve. The selection unit 616 may select the resources in descending order of reliability from among the first resources included in the selection candidates. The selection unit 616 may select the resources in descending order of rated charging power from among the first resources included in the selection candidates. The selection unit 616 may select resources suitable for the reserve corresponding to the successful bid from among the first resources included in the selection candidates based on the SOCs of the electricity storage devices.

When the adjustment period is longer than Th2 (YES in S271), the process flow moves to S271B. That the adjustment period is longer than Th2 means that the reserve request resulting from the successful bid is the second reserve request. In S271B, the selection unit 616 excludes resources with reliability lower than a predetermined second standard among the available resources (selection candidates) from the selection candidates. The second standard can be arbitrarily set. In this embodiment, the second standard is D. In S271B, resources of which the reliability rank (see FIG. 3) is E are excluded from the selection candidates.

In S273 following S271B, the selection unit 616 selects the resources classified as the second resource (S254 of FIG. 7) with priority over the resources classified as the first resource (S253 of FIG. 7) from among the selection candidates. The selection unit 616 may select all the second resources included in the selection candidates. Since the adjustment period of the second reserve request is long, the selection unit 616 may select a second resource that drops out in the middle of the adjustment period and a second resource that participates in the middle of the adjustment period as a set. As dropout and participation occur at the same time, electricity adjustment is continuously performed. As a plurality of resources sequentially performs electricity adjustment, the binding time of each resource can be shortened. The selection unit 616 may select a second resource that drops out and a second resource that participates in electricity adjustment in place of the second resource that drops out based on the SOC of the electricity storage device included in each resource and a travel plan relating to the xEV. The selection unit 616 may create a schedule of electricity adjustment such that a second resource (xEV) drops out at a timing when the second resource is expected to have been fully charged or a timing when the second resource is expected to start traveling. Then, the selection unit 616 may inform the resource management unit 611 of the created schedule (information showing resources selected for each time span included in the adjustment period).

When the number of the second resources is too large for the target reserve, the selection unit 616 may select a minimum number of second resources that can secure the target reserve. The selection unit 616 may select resources in descending order of reliability from among the second resources included in the selection candidates. The selection unit 616 may select resources in ascending order of rated charging power from among the second resources included in the selection candidates. The selection unit 616 may select resources suitable for the reserve corresponding to the successful bid from among the second resources included in the selection candidates based on the SOCs of the electricity storage devices.

For example, when the commodity corresponding to the successful bid is an FCR or an S-FRR for one time block, the determination result in S271 is NO. When the determination result in S271 is NO, the selection unit 616 narrows down the selection candidates in S271A and selects first resources in S272, and then determines in S274 whether the total of the rated charging power of the selected resources has reached the target reserve. When the number of the first resources is insufficient for the target reserve, the determination result in S274 is NO. In this case, in S275, the selection unit 616 selects resources from among the second resources (resources with a low degree of priority) included in the selection candidates such that the total of the rated charging power of the selected resources reaches the target reserve. When the total of the rated charging power of the selected resource has reached the target reserve, the sequence of processes shown in FIG. 8 ends and the process flow moves to S28 of FIG. 6.

For example, when the commodity corresponding to the successful bid is an RR, an RR-FIT, or a power source r, the duration time is one hour or longer (multiple time blocks), and therefore the determination result in S271 is YES. When the determination result in S271 is YES, the selection unit 616 narrows down the selection candidates in S271B. The selection unit 616 selects second resources in S273, and then determines in S274 whether the total of the rated charging power of the selected resources has reached the target reserve. When the number of the second resources is insufficient for the target reserve, the determination result in S274 is NO. In this case, in S275, the selection unit 616 selects resources from among the first resources (resources with a low degree of priority) included in the selection candidates such that the total of the rated charging power of the selected resource reaches the target reserve. When the total of the rated charging power of the selected resource has reached the target reserve, the sequence of processes shown in FIG. 8 ends and the process flow moves to S28 of FIG. 6.

In each of S272, S273, and S275, when the server 600 asks the users of resources to adjust electricity before selecting resources and this request is rejected, the server 600 may exclude these resources from the selection candidates.

Referring to FIG. 6 along with FIG. 1 to FIG. 3 again, in S28, the resource management unit 611 notifies the server 700 of the resources (list pattern) selected by the selection unit 616 for the commodity corresponding to the successful bid, along with information specifying the commodity (i.e., a commodity ID). The resource management unit 611 may notify the server 700 of the communication addresses and the rated charging power of the selected resources. Through the notification of S28, the server 600 may replace the resources (list pattern) specified at the time of bidding.

Further, in S28, the resource management unit 611 sends, to the user terminal of each resource selected by the selection unit 616, a notification of a provision period (an adjustment start time and an adjustment end time) allocated to the resource. The user terminal may be a terminal installed in the resource (e.g., the ECU 101 or the PCS 210), or a mobile terminal carried by the user (e.g., a tablet terminal, smartphone, wearable device, electronic key, or service tool). When the process of S28 has been executed, the sequence of processes shown in FIG. 6 ends.

Figure 9:
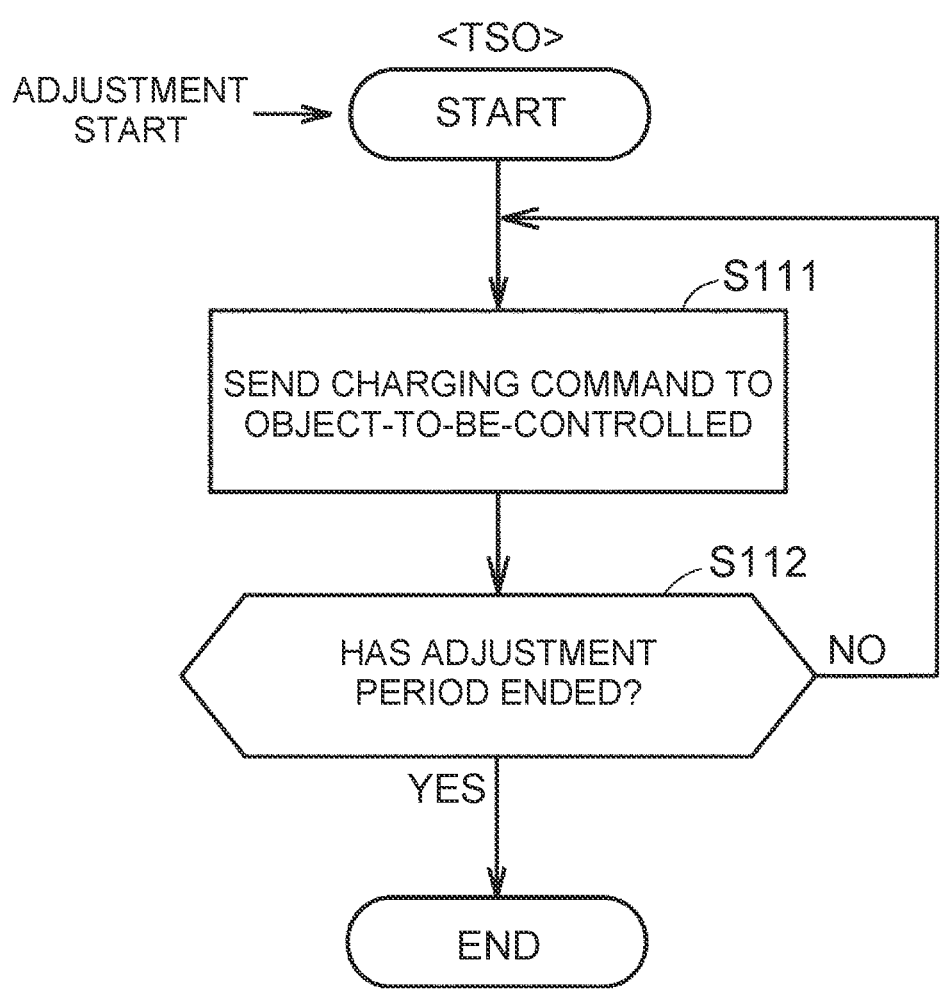
FIG. 9 is a flowchart showing a process relating to electricity adjustment executed by a server of a TSO shown in FIG. 1.

The server 700 performs electricity adjustment of the power grid PG using the reserve (commodity corresponding to the successful bid) secured in the demand-supply adjustment market. Specifically, the server 700 controls each resource selected for that commodity based on the notification from the server 600 (S28 of FIG. 6). FIG. 9 is a flowchart showing a process relating to electricity adjustment executed by the server 700 (TSO). The process shown in this flowchart is started when the adjustment start time of the commodity corresponding to the successful bid comes.

Referring to FIG. 9 along with FIG. 1 to FIG. 3, in S111, the server 700 generates a command requesting an object-to-be-controlled to adjust electricity within the range of the amount of Δ kW as agreed upon based on the demand-supply status of the power grid PG, and sends the generated command to the object-to-be-controlled. Specifically, the server 700 sends a charging command indicating charging power according to the demand-supply status of the power grid PG (including a charging stop command indicating charging power of 0 kW) to the object-to-be-controlled. The object-to-be-controlled that is controlled through this command is each of the resources notified by the server 600 (S28 of FIG. 6). The server 700 causes these resources to act as reserves (commodities corresponding to the successful bid) through remote control.

In S112, the server 700 determines whether the adjustment period for the commodity corresponding to the successful bid has ended. When it is within the adjustment period, the determination result in S112 is NO and the process flow returns to S111. By the process of S111, electricity adjustment of the power grid PG is performed by the reserves provided by the aggregator (the selected resources). Thereafter, when the adjustment end time of the commodity corresponding to the successful bid comes (YES in S112), the sequence of processes shown in FIG. 9 ends.

During the adjustment period, the server 600 may monitor whether the selected xEVs are electrically connected to the power grid PG, and when there is an xEV that is not electrically connected to the power grid PG, notify the server 700 of a substitute resource that is electrically connected to the power grid PG. Further, during the adjustment period, the server 600 may monitor whether the selected resources are experiencing an abnormality, and when there is a resource that is experiencing an abnormality, notify the server 700 of a substitute resource that is normal.

In the above example, the server 700 directly controls each resource. However, without being limited to this example, the server 700 may control each resource through the server 600. The server 700 may send a command to the server 600, and the server 600 may remotely control each resource in accordance with a command from the server 700.

The aggregator secures a reserve for eliminating imbalance in generation-consumption balance relating to the power grid PG by using the server 600. The server 600 generates a reserve request when imbalance in generation-consumption balance relating to the power grid PG occurs. Then, the server 600 selects, for the reserve request, resources (including electricity storage devices) to act as reserves from the resource group 500.

Figure 10:
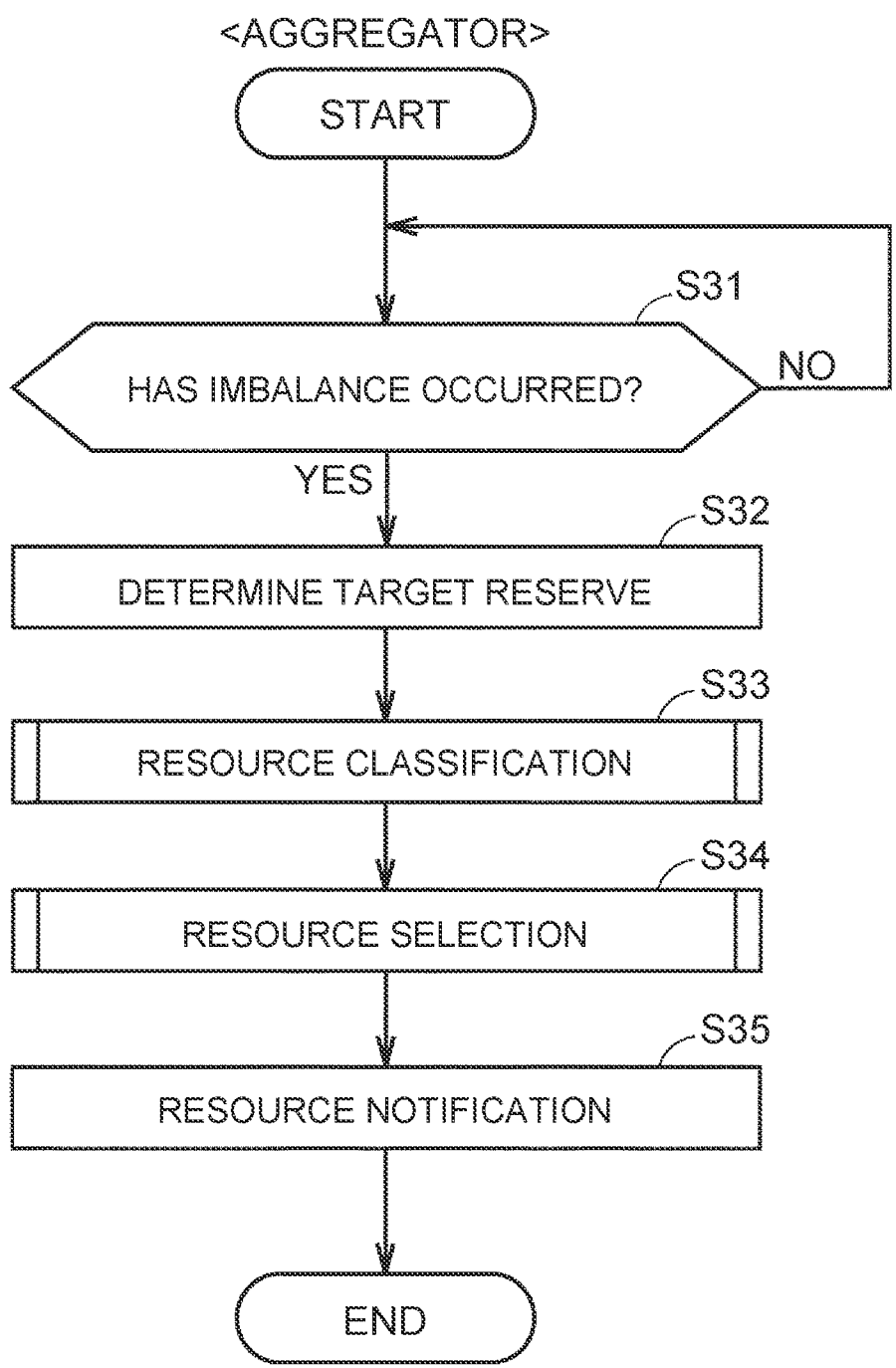
FIG. 10 is a flowchart showing a process relating to securing a reserve for eliminating imbalance executed by the management computer shown in FIG. 3.

FIG. 10 is a flowchart showing a process relating to securing of a reserve for eliminating imbalance executed by the server 600. The process shown in this flowchart is started, for example, when a planned value is input into the server 600.

Referring to FIG. 10 along with FIG. 1 to FIG. 3, in S31, the demand-supply management unit 613 monitors the generation-consumption balance relating to the power grid PG. Specifically, in S31, the demand-supply management unit 613 determines whether imbalance in the generation-consumption balance (a difference between a planned value and actual demand and supply) relating to the power grid PG is within a predetermined allowable range, and when the imbalance exceeds the allowable range (YES in S31), moves the process to S32. That the determination result in S31 is YES means that imbalance in the generation-consumption balance relating to the power grid PG has occurred. That the demand-supply management unit 613 has moved the process to S32 means that the demand-supply management unit 613 has generated a reserve request.

In S32, the reserve calculation unit 615 determines a target reserve for the reserve request. For example, the reserve calculation unit 615 determines, as the target reserve, a value obtained by multiplying the reserve (Δ kW) required to eliminate the imbalance by a predetermined allowance factor (e.g., a factor selected from a range of larger than 1.0 and not larger than 2.0). In S33, the classification unit 612 executes the resource classification for resources available as reserves. Here, resources that are electrically connected to the power grid PG and are not experiencing an abnormality are recognized as resources available as reserves. The process of S33 is the same as, for example, the process shown in FIG. 7 described above.

Figure 11:
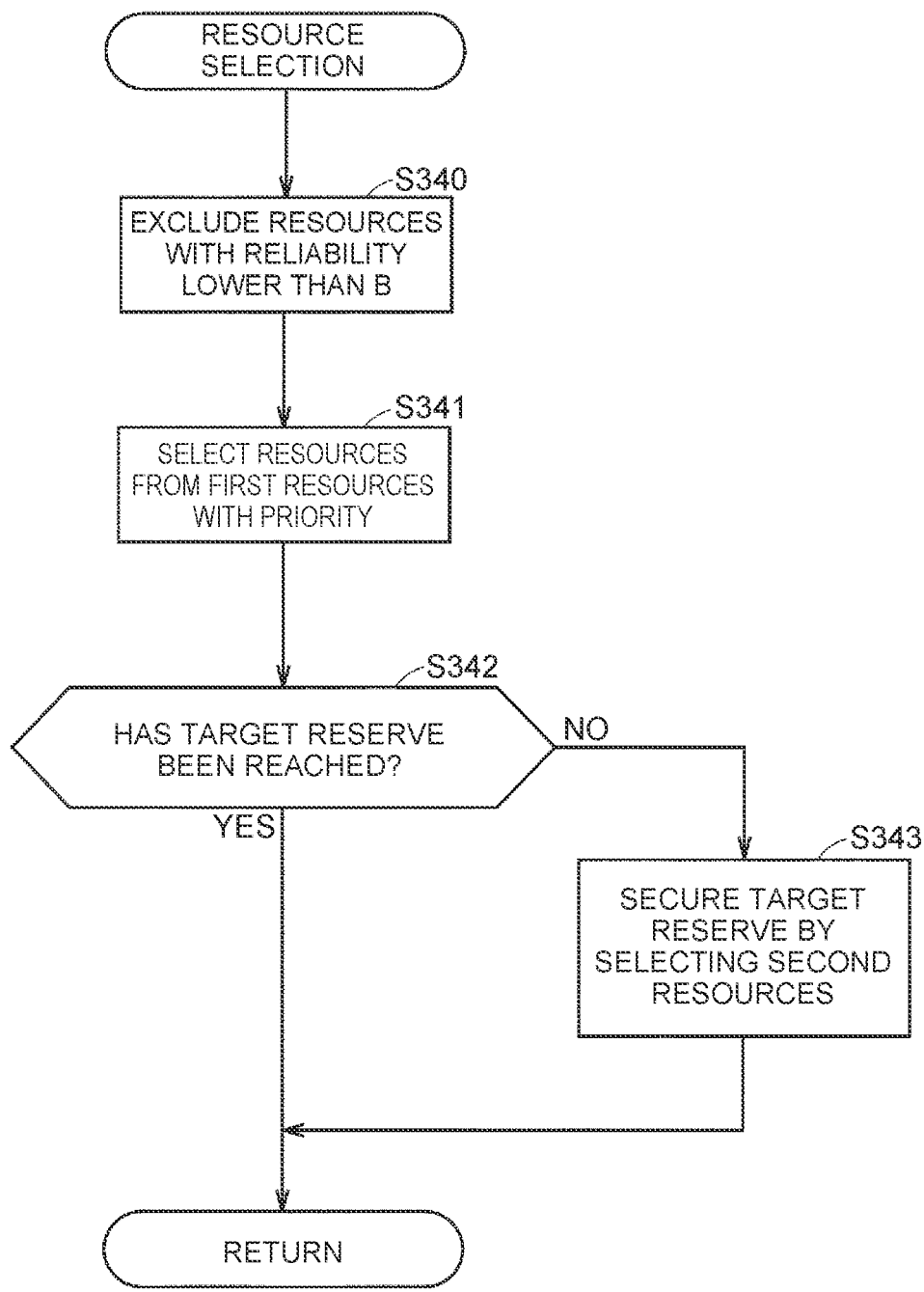
FIG. 11 is a flowchart showing details of resource selection shown in FIG. 10.

In subsequent S34, the selection unit 616 executes the resource selection. FIG. 11 is a flowchart showing details of S34.

Referring to FIG. 11 along with FIG. 1 to FIG. 3, in S340, the selection unit 616 excludes resources with reliability lower than a predetermined third standard among the available resources (selection candidates) from the selection candidates. The third standard can be arbitrarily set. In this embodiment, the third standard is B. In S340, resources of which the reliability rank (see FIG. 3) is C, D, or E are excluded from the selection candidates.

In S341 following S340, the selection unit 616 selects the resources classified as the first resource with priority over the resources classified as the second resource. The selection unit 616 may select all the first resources included in the selection candidates. When the number of the first resources is too large for the target reserve, the selection unit 616 may select a minimum number of first resources that can secure the target reserve. The selection unit 616 may select resources in descending order of reliability from among the first resources included in the selection candidates. The selection unit 616 may select resources in descending order of rated charging power from among the first resources included in the selection candidates. The selection unit 616 may select resources suitable for eliminating the imbalance from among the first resources included in the selection candidates based on the SOCs of the electricity storage devices. When the server 600 asks users of resources to adjust electricity before selecting resources and this request is rejected, the server 600 may exclude these resources from the selection candidates.

In subsequent S342, the selection unit 616 determines whether the total of the rated charging power of the selected resources has reached the target reserve. When the number of the first resources is insufficient for the target reserve, the determination result in S342 is NO. In this case, in S343, the selection unit 616 selects resources from among the second resources (resources with a lower degree of priority) included in the selection candidates such that the total of the rated charging power of the selected resources reaches the target reserve. When the total of the rated charging power of the selected resources has reached the target reserve (YES in S342), the sequence of processes shown in FIG. 11 ends and the process flow moves to S35 of FIG. 10.

Referring to FIG. 10 along with FIG. 1 to FIG. 3 again, in S35, the resource management unit 611 sends, to the user terminal of each resource selected by the selection unit 616, a notification that the resource will be used for electricity adjustment (elimination of imbalance). The user terminal may be a terminal installed in the resource or a mobile terminal carried by the user. When the process of S28 has been executed, the sequence of processes shown in FIG. 10 ends.

Figure 12:
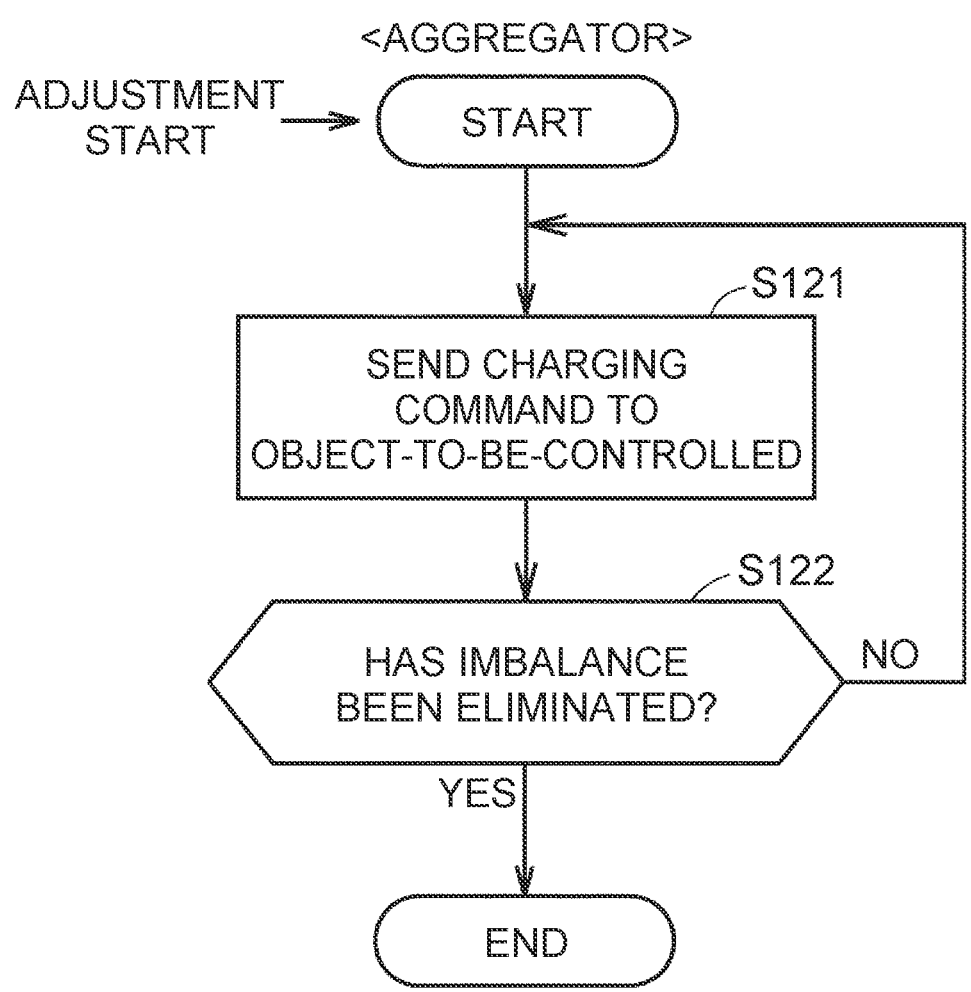
FIG. 12 is a flowchart showing a process relating to elimination of imbalance executed by the management computer shown in FIG. 3.

The server 600 eliminates the imbalance using the reserves secured as described above. FIG. 12 is a flowchart showing a process relating to elimination of imbalance executed by the server 600 (aggregator). The process shown in this flowchart is executed, for example, following the process shown in FIG. 10.

Referring to FIG. 12 along with FIG. 1 to FIG. 3, in S121, the server 600 generates a command for eliminating the imbalance based on the actual demand and supply of the power grid PG and sends the generated command to objects to be controlled. Specifically, the resource management unit

611 sends a charging command indicating charging power according to the imbalance (including a charging stop command indicating charging power of 0 kW) to the objects to be controlled. The object-to-be-controlled through this command is each resource selected by the process shown in FIG. 10. The resource management unit 611 causes these resources to act as reserves to eliminate the imbalance through remote control. The actual demand and supply of the power grid PG are monitored by the demand-supply management unit 613.

In S122, the server 600 determines whether the imbalance has been eliminated. Specifically, the demand-supply management unit 613 determines whether the actual demand and supply of the power grid PG match the planned value. When the actual demand and supply of the power grid PG do not match the planned value (NO in S122), the process flow returns to S121. By the process of S121, electricity adjustment of the power grid PG for eliminating the imbalance is performed. When the actual demand and supply of the power grid PG match the planned value as a result of the process of S121 (YES in S122), the sequence of processes shown in FIG. 12 ends.

In the above-described example, the server 600 directly controls each resource. However, this disclosure is not limited to this example. In a form in which the server 600 belongs to a sub-aggregator (resource aggregator), the server 600 may control each resource in accordance with a command from a master aggregator (aggregation coordinator). The server 600 may generate a reserve request in response to a request from the master aggregator.

FIG. 13 is a graph illustrating the electricity adjustment method according to this embodiment. In the example shown in FIG. 13, a second reserve request for which the adjustment period is the first to third time blocks is generated. In the second time block shown in FIG. 13, no reserve request other than the second reserve request is generated. In each of the first time block and the third time block, a first reserve request for which the adjustment period is one time block (30 minutes) or a reserve request attributable to imbalance is generated.

Referring to FIG. 13, the server 600 according to this embodiment selects resources corresponding to the second resource with priority over resources corresponding to the first resource in the resource selection for the second reserve request. Since the adjustment period of the second reserve request is long, when the resource manager (user) is asked to adjust electricity for the adjustment period, it is highly likely that the adjusting resource drops out in the middle of the adjustment period. When the second resource (see FIG. 7) having a smaller reserve is selected as an adjusting resource, the reserve lost by dropout of the adjusting resource is smaller. Therefore, it is easy to recover from the dropout of the adjusting resource. Even when recovery fails (i.e., a substitute reserve fails to be secured), only a small penalty is incurred. For the second reserve request, selecting adjusting resources from the second resources having a smaller reserve with priority can mitigate the loss due to dropout of adjusting resources.

In the resource selection for the first reserve request, the server 600 selects resources corresponding to the first resource with priority over resources corresponding to the second resource. The first reserve request requests a reserve for a short period (adjustment period). Since the adjustment period of the first reserve request is short, when an adjusting resource is asked to adjust electricity for the adjustment period, it is less likely that the adjusting resource drops out in the middle of the adjustment period. Moreover, when the first resource having a greater reserve is selected as an adjusting resource, the requested reserve can be met by a smaller number of adjusting resources. Therefore, it is even less likely that the adjusting resources drop out. For the first reserve request, selecting adjusting resources from the first resources having a greater reserve with priority can increase the chance of securing sufficient reserves.

Also in the resource selection for a reserve request for eliminating imbalance, the server 600 selects resources corresponding to the first resource with priority over resources corresponding to the second resource. Such resource selection can increase the chance of eliminating imbalance in generation-consumption balance.

In this embodiment, the selection criterion relating to reliability is more stringent in each of the resource selection for the first reserve request and the resource selection for the reserve request attributable to imbalance than in the resource selection for the second reserve request. Specifically, the first standard (S271A of FIG. 8) is higher than each of the second standard (S271B of FIG. 8) and the third standard (S340 of FIG. 11). When a first resource having a greater reserve drops out, a greater reserve is lost. Therefore, only first resources with high reliability are selected to thereby reduce the likelihood of dropout of the first resources. This configuration allows electricity adjustment using a small number of well-selected resources.

As has been described above, the electricity adjustment method according to this embodiment includes the resource classification (FIG. 7), the reserve determination (S271 of FIG. 8), the first resource selection (S272 of FIG. 8), the second resource selection (S273 of FIG. 8), and the resource control (FIG. 9 and FIG. 12) shown below.

In the resource classification, each of a plurality of resources each capable of acting as a reserve of an external power source (power grid PG) is classified as the first resource or the second resource having lower rated charging power than the first resource. In the reserve determination, it is determined whether a reserve request is the first reserve request or the second reserve request that requests electricity adjustment for a longer adjustment period than the first reserve request. In the first resource selection, when the reserve request is determined to be the first reserve request (NO in S271 of FIG. 8), resources corresponding to the first resource are selected with priority over resources corresponding to the second resource in selecting reserves for the reserve request. In the second resource selection, when the reserve request is determined to be the second reserve request (YES in S271 of FIG. 8), resources corresponding to the second resource are selected with priority over resources corresponding to the first resource in selecting reserves for the reserve request. In the resource control, the resources selected as reserves for the reserve request are caused to act as reserves of the external power source.

This electricity adjustment method makes it possible to easily and accurately select appropriate resources in selecting resources to act as reserves.

In the process shown in FIG. 8, the server 600 selects resources from the first resources in the resource selection for the first reserve request such that the total of the rated charging power of the selected resources approaches the target reserve (S272 of FIG. 8). When all resources corresponding to the first resource are selected and yet the total of the rated charging power of the selected resources does not reach the target reserve for the first reserve request, the server 600 selects resources enough to cover the shortage from the second resources (S275 of FIG. 8). The server 600 selects resources from the second resources in the resource selection for the second reserve request such that the total of the rated charging power of the selected resources approaches the target reserve (S273 of FIG. 8). When all resources corresponding to the second resource are selected and yet the total of the rated charging power of the selected resources does not reach the target reserve for the second reserve request, the server 600 selects resources enough to cover the shortage from the first resources (S275 of FIG. 8). This configuration can increase the chance of securing sufficient reserves for each of the first reserve request and the second reserve request.

The server 600 may be configured to perform the resource selection by the method shown in FIG. 8 when a predetermined condition is met, and to perform the resource selection by another method when the predetermined condition is not met. The server 600 may determine whether the predetermined condition is met based on at least one of the time of day, the requested reserve (required reserve), the type of available resources, and the reliability of the available resources. The server 600 may switch the method of the resource selection according to, for example, the time of day.

In the process shown in FIG. 8, S271A and S271B are not essential. S271A and S271B may be omitted. In the process shown in FIG. 11, S340 is not essential. S340 may be omitted.

In the above embodiment, the resource group 500 (objects to be managed) includes the xEV 100 and the ESS 200. The server 600 can use the ESS 200 that is always connected to the power grid PG as a reserve of the power grid PG. The server 600 can use the xEV 100 (vehicle) that is electrically connected to the power grid PG through the EVSE 310 (charging facility) as a reserve of the power grid PG. However, without being limited thereto, the resource group 500 may include only either the xEV 100 or the ESS 200. For example, the server 600 may manage only vehicles as resources.

The power grid PG is not limited to a large-scale alternating-current grid provided by an electric power company but may also be a microgrid or a direct-current (DC) grid. Each of the xEV 100 and the ESS 200 may include a charger or a charger-discharger for direct-current electricity. The xEV 100 may include a charger-discharger instead of the charger 102. In the xEV connected state, the ECU 101 may control the charger-discharger such that appropriate electricity is output from the battery B1 to the inlet 103 in the xEV connected state. The server 600 may cause the battery B1 to discharge for electricity adjustment of the power grid PG through remote control. The function of the charger-discharger may be provided in the EVSE instead of the xEV. A connector of the charging cable may have a built-in charger-discharger.

The xEV may be configured to be able to contactlessly charge and discharge. The xEV may be configured to be able to perform autonomous driving or may include a flight function. The xEV is not limited to a passenger car but may also be a bus or a truck. The xEV may be a vehicle capable of driverless travel (e.g., a robot taxi, an automated guided vehicle (AGV), or an agricultural machine). The resource may be a movable body other than an xEV (e.g., a railroad vehicle, ship, airplane, drone, walking robot, or robot cleaner). The server 600 may perform electricity control by restricting electricity demand in a building (resource).

The embodiment disclosed this time should be construed as in every respect merely illustrative and not restrictive. The range of the present disclosure is defined not by the description of the above-described embodiment but by the claims and is intended to include all changes equivalent in meaning and scope to the claims.

What is claimed is:

1. A computer that manages a plurality of resources each capable of acting as a reserve of an external power source, wherein:
   each of the plurality of resources includes an electricity storage device;
   the computer is configured to execute:
   resource classification of classifying each of the plurality of resources as a first resource or a second resource having higher rated charging power than the first resource, and
   resource selection of selecting, for a reserve request, resources to act as the reserve from among the plurality of resources;
   the computer is configured to select resources corresponding to the first resource with priority over resources corresponding to the second resource in the resource selection for a first reserve request, and to select resources corresponding to the second resource with priority over resources corresponding to the first resource in the resource selection for a second reserve request;
   an adjustment period of the second reserve request is longer than an adjustment period of the first reserve request;
   the computer is configured to determine a target reserve for the reserve request;
   the computer is configured to select resources to act as reserves for the reserve request in the resource selection such that a total of rated charging power of the selected resources reaches the target reserve;
   the computer is further configured to cause the selected resources corresponding to the first resources to act as reserves to reach the target reserve, or configured to cause the selected resources corresponding to the second resources to act as reserves to reach the target reserve;
   the computer is configured to select resources from the first resources in the resource selection for the first reserve request such that a total of rated charging power of the selected resources corresponding to first resources approaches the target reserve, and when all resources corresponding to the first resources are selected and yet the total of rated charging power of the selected resources corresponding to the first resources does not reach the target reserve, select resources enough to reach the target reserve from the second resources; and
   the computer is configured to select resources from the second resources in the resource selection for the second reserve request such that a total of rated charging power of the selected resources corresponding to second resources approaches the target reserve, and when all resources corresponding to the second resources are selected and yet the total of rated charging power of the selected resources corresponding to the second resources does not reach the target reserve, select resources enough to reach the target reserve from the first resources.

2. The computer according to claim 1, wherein:
   the computer is configured to trade reserves in an electricity market and generate the reserve request when the computer has made a successful bid for a reserve in the electricity market;

in the electricity market, reserves are traded on a time block basis; and in the resource selection for selecting resources to act as the reserve corresponding to the successful bid, a reserve request of a predetermined number or a smaller number of time blocks corresponds to the first reserve request and a reserve request exceeding the predetermined number of time blocks corresponds to the second reserve request.

3. The computer according to claim 2, wherein:
a length of the time block is 30 minutes; and
the predetermined number of time blocks is one time block.

4. The computer according to claim 1, wherein:
the computer is configured to generate the reserve request when imbalance in generation-consumption balance relating to the external power source occurs; and
the computer is configured to select resources corresponding to the first resource with priority over resources corresponding to the second resource in the resource selection for selecting resources to act as reserves for eliminating the imbalance.

5. The computer according to claim 1, wherein:
the first resource is a resource with rated charging power higher than a criterion value;
the second resource is a resource with rated charging power equal to or lower than the criterion value; and
the criterion value is 2 kW or higher and 5 kW or lower.

6. The computer according to claim 1, wherein the plurality of resources includes a vehicle that is electrically connected to the external power source through a charging facility.

7. The computer according to claim 1, wherein the computer is configured to cause resources selected by the resource selection to act as reserves through remote control.

8. An electricity adjustment method comprising:
classifying each of a plurality of resources each capable of acting as a reserve of an external power source as a first resource or a second resource having higher rated charging power than the first resource;
determining whether a reserve request is a first reserve request or a second reserve request that requests electricity adjustment for a longer adjustment period than the first reserve request;
when the reserve request is determined to be the first reserve request, selecting resources corresponding to the first resource with priority over resources corresponding to the second resource in selecting reserves for the reserve request;
when the reserve request is determined to be the second reserve request, selecting resources corresponding to the second resource with priority over resources corresponding to the first resource in selecting reserves for the reserve request;
causing the resources selected as reserves for the reserve request to act as reserves of the external power source;
determining a target reserve for the reserve request;
selecting resources to act as reserves for the reserve request in the resource selection such that a total of rated charging power of the selected resources reaches the target reserve;
causing the selected resources corresponding to the first resources to act as reserves to reach the target reserve, or causing the selected resources corresponding to the second resources to act as reserves to reach the target reserve;
selecting resources from the first resources in the resource selection for the first reserve request such that a total of rated charging power of the selected resources corresponding to first resources approaches the target reserve, and when all resources corresponding to the first resources are selected and yet the total of rated charging power of the selected resources corresponding to the first resources does not reach the target reserve, select resources enough to reach the target reserve from the second resources; and
selecting resources from the second resources in the resource selection for the second reserve request such that a total of rated charging power of the selected resources corresponding to second resources approaches the target reserve, and when all resources corresponding to the second resources are selected and yet the total of rated charging power of the selected resources corresponding to the second resources does not reach the target reserve, select resources enough to reach the target reserve from the first resources.

* * * * *